United States Patent
Kouno et al.

(10) Patent No.: US 9,998,071 B2
(45) Date of Patent: Jun. 12, 2018

(54) FAILURE DIAGNOSIS METHOD AND FAILURE DIAGNOSIS SYSTEM FOR PHOTOVOLTAIC SYSTEM

(71) Applicant: Hitachi, Ltd., Tokyo (JP)

(72) Inventors: Toru Kouno, Tokyo (JP); Tetsuharu Ohya, Tokyo (JP); Yuuichi Nagayama, Tokyo (JP); Tomoharu Nakamura, Tokyo (JP); Koki Morikawa, Tokyo (JP); Satoshi Miyazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 854 days.

(21) Appl. No.: 14/484,303

(22) Filed: Sep. 12, 2014

(65) Prior Publication Data
US 2015/0094967 A1   Apr. 2, 2015

(30) Foreign Application Priority Data
Sep. 27, 2013   (JP) .................. 2013-201812

(51) Int. Cl.
*G01R 31/00*   (2006.01)
*G01R 27/00*   (2006.01)
(Continued)

(52) U.S. Cl.
CPC ............ *H02S 50/00* (2013.01); *G01R 31/025* (2013.01); *H02H 1/0015* (2013.01)

(58) Field of Classification Search
CPC ....... H02S 50/00; H02S 50/10; G01R 31/405; G01R 31/025; G01R 27/02;
(Continued)

(56) References Cited

U.S. PATENT DOCUMENTS

| | | | | |
|---|---|---|---|---|
| 5,669,987 A | * | 9/1997 | Takehara | ................ H02S 50/10 136/244 |
| 6,512,458 B1 | * | 1/2003 | Kobayashi | .............. H02S 50/10 340/507 |

(Continued)

FOREIGN PATENT DOCUMENTS

| | | | | |
|---|---|---|---|---|
| GB | 2493462 A | * | 2/2013 | ............... G05F 1/67 |
| JP | 2010-123880 | | 6/2010 | |

OTHER PUBLICATIONS

T. Kouno et al., A Technique for Detecting Faults in a Photovoltaic Array, Proceedings of 27th European Photovoltaic Solar Energy Conference and Exhibition, pp. 3610-3615, Sep. 24, 2012.
(Continued)

*Primary Examiner* — Mohamed Charioui
*Assistant Examiner* — Leonard S Liang
(74) *Attorney, Agent, or Firm* — Baker Botts L.L.P.

(57) ABSTRACT

A failure diagnosis system is configured to calculate an estimated irradiation on a first photovoltaic string and an estimated operating temperature of the first photovoltaic string based on a short-circuit current and an open-circuit voltage on a current-voltage characteristic of the first photovoltaic string, and the array output voltage value and the array output current value measured by an array measurement apparatus. The failure diagnosis system is configured to calculate an estimated current value of the first photovoltaic string based on the estimated irradiation, the estimated operating temperature, and the current-voltage characteristic. The failure diagnosis system is configured to diagnose degradation of the first photovoltaic string by comparing the measured current value of the first photovoltaic string and the estimated current value.

10 Claims, 16 Drawing Sheets

(51) Int. Cl.
    *G01R 25/00*     (2006.01)
    *H02S 50/00*     (2014.01)
    *G01R 31/02*     (2006.01)
    *H02H 1/00*     (2006.01)

(58) Field of Classification Search
    CPC ........... G01R 31/31725; G01R 29/0273; H02J 3/383; H01L 31/02021; Y02E 10/50; H02H 1/0015; G06F 17/5036; G01J 3/28; G01N 21/3504
    See application file for complete search history.

(56) References Cited

U.S. PATENT DOCUMENTS

| | | | | |
|---|---|---|---|---|
| 6,876,187 | B2* | 4/2005 | Matsuyama | H02S 50/10 324/761.01 |
| 8,744,791 | B1* | 6/2014 | Kraft | H02S 50/00 702/65 |
| 2004/0264225 | A1* | 12/2004 | Bhavaraju | G05F 1/67 363/120 |
| 2005/0172995 | A1* | 8/2005 | Rohrig | H01L 31/02021 136/243 |
| 2008/0147335 | A1* | 6/2008 | Adest | G01D 4/004 702/64 |
| 2010/0106339 | A1* | 4/2010 | Little | G01D 9/005 700/293 |
| 2010/0332167 | A1* | 12/2010 | Nuotio | H02S 50/10 702/65 |
| 2011/0184583 | A1* | 7/2011 | El-Barbari | H02S 50/10 700/297 |
| 2011/0282600 | A1* | 11/2011 | Roesner | H02S 50/10 702/60 |
| 2012/0056638 | A1* | 3/2012 | Swahn | H02S 50/10 324/761.01 |
| 2013/0201027 | A1* | 8/2013 | Bucher | H02S 50/10 340/660 |
| 2013/0300449 | A1* | 11/2013 | Nakamura | H01L 31/02021 324/761.01 |
| 2013/0311121 | A1* | 11/2013 | Kohno | G01R 31/405 702/64 |
| 2014/0058688 | A1* | 2/2014 | Kohno | H02S 50/10 702/58 |
| 2014/0070815 | A1* | 3/2014 | Liu | H02S 50/10 324/510 |

OTHER PUBLICATIONS

Notification of Reasons for Refusal, dated Jan. 31, 2017, which issued during the prosecution of Japanese Patent Application No. 2013-201812, which corresponds to the present application (English translation attached).

* cited by examiner

FAILURE DIAGNOSIS METHOD AND FAILURE DIAGNOSIS SYSTEM FOR PHOTOVOLTAIC SYSTEM

CLAIM OF PRIORITY

The present application claims priority from Japanese patent application JP2013-201812 filed on Sep. 27, 2013, the content of which is hereby incorporated by reference into this application.

BACKGROUND

This invention relates to a failure diagnosis technology for diagnosing a failure occurring in a photovoltaic system including a large number of photovoltaic modules.

A large-scale photovoltaic system as represented by a mega solar system includes several thousands to hundreds of thousands of 100-watt to 200-watt class photovoltaic modules arranged in one power generation site and requires failure detection technologies and maintenance technologies. An output of each of the photovoltaic modules gradually decreases under the same irradiation and temperature conditions due to degradation over time. However, the outputs of some modules suddenly drop due to manufacturing quality or physical damage. A state in which the output suddenly drops is referred to as "failure".

Output characteristics of the photovoltaic system considerably vary depending on environmental conditions such as the irradiation. Therefore, even in the case where its normal output is not obtained due to a failure or degradation of the photovoltaic modules constructing a photovoltaic panel, it is difficult to distinguish the output drop due to the failure or degradation from that under the effects of the environmental conditions. As a method of detecting the failure of the photovoltaic module, a visual inspection, a heat-generation inspection using a thermometer, and an electrical characteristic inspection using a tester have been conducted. However, the above-mentioned inspections are conducted for each of the photovoltaic modules. Therefore, there is a problem in that, for the mega solar system which includes hundreds of thousands of photovoltaic modules, the efforts and costs required for the inspection are disadvantageously increased.

To cope with the problem described above, the following method is disclosed in JP 2010-123880 A. According to the method, measurement means and communication means are provided for each of the photovoltaic modules. In order to automatically determine whether or not a failure occurs in the photovoltaic module, the result of measurement transmitted from the communication means and a threshold value are compared with each other.

JP 2010-123880 A discloses the method in which the measurement means and the communication means are provided for each of the photovoltaic modules. The measurement means and the communication means, which are to be mounted to each of the photovoltaic modules, additionally require means for installing the measurement means and the communication means. The means for the installation is required to have a life span of 10 years to 20 years. Therefore, extremely high installation costs are required. Moreover, the output characteristics of the photovoltaic module considerably vary depending on the environmental conditions such as the irradiation. Thus, it has hitherto been difficult to set a threshold value for determining the output drop of the photovoltaic module due to a failure or degradation.

SUMMARY

In view of the circumstances described above, an object of this invention is to provide a failure diagnosis method which realizes failure detection with high accuracy in a photovoltaic system.

A representative example of this invention is a failure diagnosis system for a photovoltaic system including a photovoltaic array formed by connecting a plurality of photovoltaic strings in parallel, each of the plurality of photovoltaic strings being formed by serially connecting a plurality of photovoltaic modules. The failure diagnosis system includes: an array measurement apparatus configured to measure an output voltage and an output current of the photovoltaic array; string current measurement apparatus configured to measure output currents of the plurality of photovoltaic strings; and a monitoring apparatus. The monitoring apparatus is configured to calculate an estimated irradiation on a first photovoltaic string included in the plurality of photovoltaic strings and an estimated operating temperature of the first photovoltaic string based on a short-circuit current and an open-circuit voltage on a current-voltage characteristic of the first photovoltaic string, and the array output voltage value and the array output current value measured by the array measurement apparatus. The monitoring apparatus is configured to calculate an estimated current value of the first photovoltaic string based on the estimated irradiation, the estimated operating temperature, and the current-voltage characteristic. The monitoring apparatus is configured to diagnose degradation of the first photovoltaic string by comparing the measured current value of the first photovoltaic string, which is measured by the string current measurement apparatus, and the estimated current value.

According to one embodiment of this invention, it is possible to realize the failure detection with high accuracy in the photovoltaic system.

DETAILED DESCRIPTION OF EMBODIMENTS

Hereinafter, embodiments will be described with reference to the accompanying drawings. It should be noted that the embodiments are merely examples to implement this invention and are not to limit the technical scope of this invention. Throughout the drawings, common elements are denoted by the same reference signs.

In the embodiments described below, an irradiation on a photovoltaic array is obtained from an operating current of the photovoltaic array by using a predetermined coefficient. An operating temperature of the photovoltaic array is calculated by using the operating voltage and the irradiation. By using the calculated operating temperature and the irradiation, a failure of a photovoltaic string is diagnosed. Prior to the description of the embodiments, a photovoltaic system provided in a mega solar power generation site to which the embodiments are to be applied is described.

Figure 1:
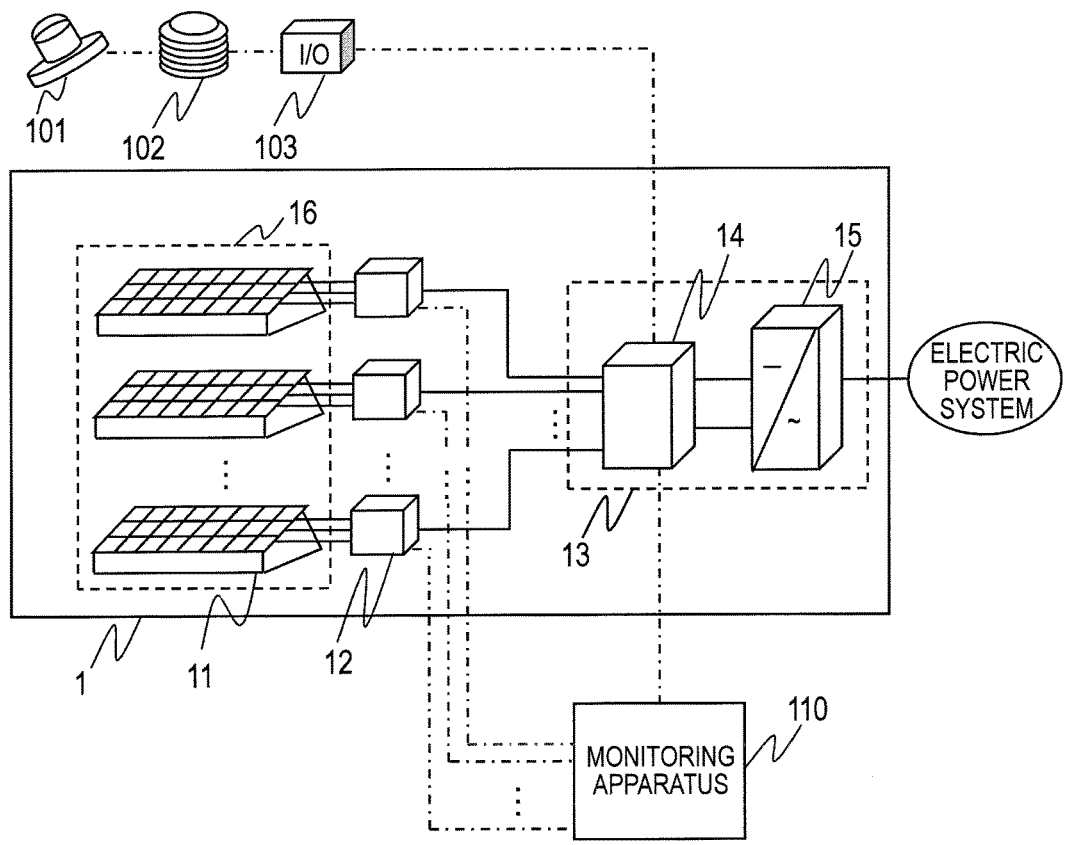
FIG. 1 is a diagram illustrating a configuration example of a mega solar power generation site according to each of embodiments.

FIG. 1 is a diagram illustrating a configuration of a mega solar system which is installed in a mega solar power generation site. The mega solar system (photovoltaic system) 1 includes a photovoltaic array 16, a plurality of junction boxes 12, and a power conditioner system (PCS) 13. The photovoltaic array 16 includes a plurality of photovoltaic string groups 11. Each of the photovoltaic string groups 11 is connected to a corresponding one of the junction boxes 12. The photovoltaic string groups 11 are connected to the corresponding junction boxes 12 in parallel to each other. The junction boxes 12 integrate wirings from the photovoltaic string groups 11 to transmit DC power to the power conditioner system 13.

The power conditioner system (PCS) 13 includes a DC/DC converter 14 and an AC/DC inverter 15. The DC/DC converter 14 also serves to collect power. Controlling an operating point of the photovoltaic array 16 so that maximum electric power can be collected from the photovoltaic array 16 connected to the DC/DC converter 14 is referred to as "maximum power point tracking (MPPT) control".

The MPPT control is achieved by using the DC power measured by an ammeter and a voltmeter included in the DC/DC converter 14 to control a current or a voltage of the photovoltaic array 16. The power conditioner system 13 uses the DC/DC converter 14, which is a DC boost converter, to boost a DC voltage from the photovoltaic array 16 and supplies the boosted voltage to the AC/DC inverter 15. The power conditioner system 13 outputs an AC voltage and an AC current obtained by the conversion by the AC/DC inverter 15 to an electric power system.

A pyranometer 101 and a thermometer 102 are provided in the mega solar power generation site. An interface 103 converts signals from the pyranometer 101 and the thermometer 102 into current signals at 4 milliamperes to 20 milliamperes and transmits the current signals to the DC/DC converter 14.

The DC/DC converter 14 transmits information of the DC current value and the DC voltage value of the photovoltaic array 16, an irradiation, and a temperature, which are synchronized to each other, to a monitoring apparatus 110. Each of the junction boxes 12 includes a measurement apparatus and transmits a DC current value and a DC voltage value measured for each photovoltaic string to the monitoring apparatus 110 through a transmission path. Specifically, the monitoring apparatus 110 obtains information of the irradiation on and the temperature of the mega solar power generation site, the DC current value and the DC voltage value of the photovoltaic array 16, and the DC current value and the DC voltage value of each of the photovoltaic strings.

Figure 2:
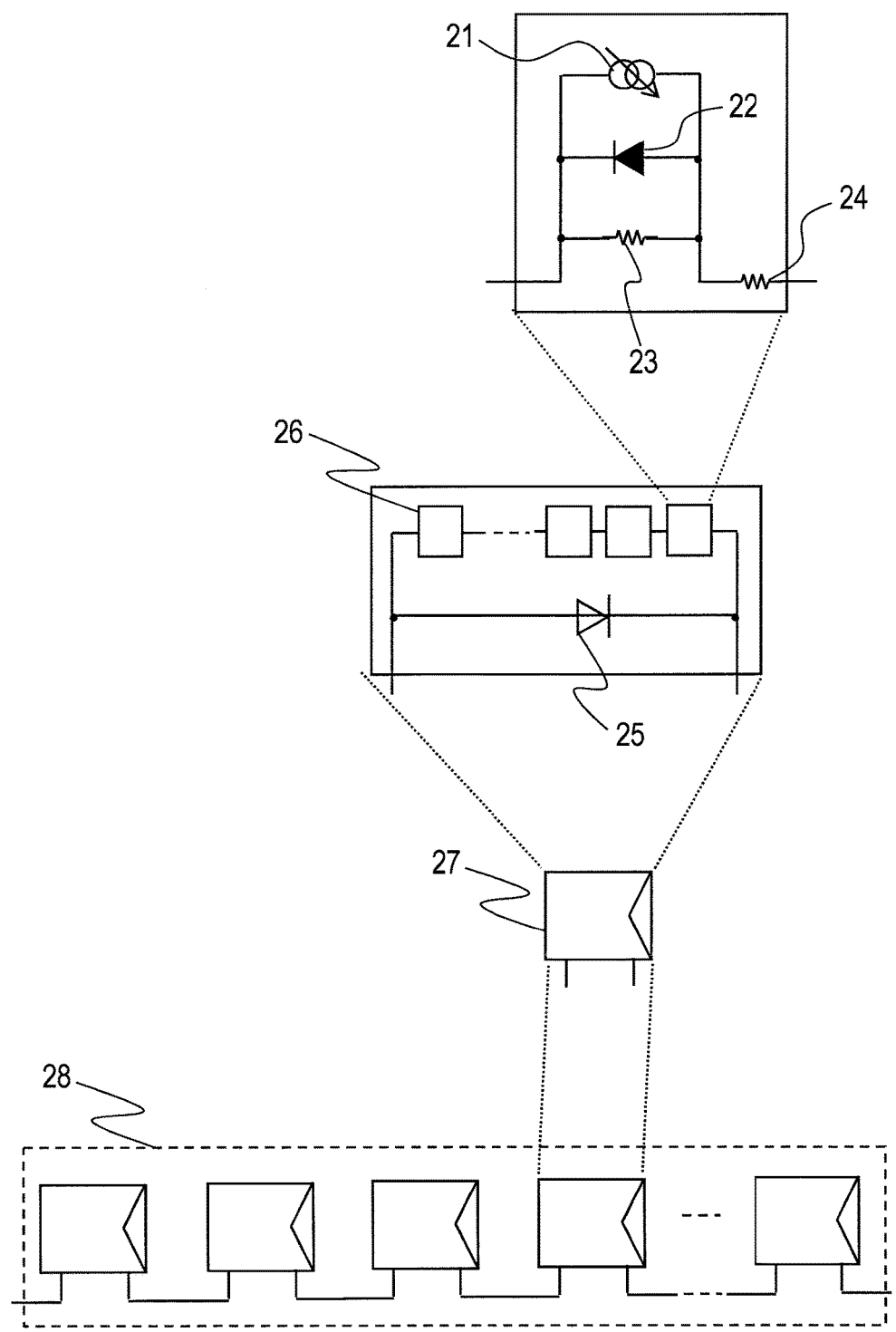
FIG. 2 is a diagram illustrating a configuration example of a photovoltaic string and wirings according to each of the embodiments.

FIG. 2 schematically illustrates a configuration example of photovoltaic cells 26, photovoltaic modules 27, and a photovoltaic string 28. The photovoltaic modules 27 are constituent elements of the photovoltaic string 28. In the photovoltaic string 28, a plurality of the photovoltaic modules 27 are connected in series.

As illustrated in FIG. 2, the photovoltaic module 27 includes a group of the serially connected photovoltaic cells 26 and a bypass diode 25 which is connected in parallel to both ends of the group of the photovoltaic cells 26. When a reverse bias is applied to the photovoltaic module 27, the bypass diode 25 prevents a current from flowing in the opposite direction.

The photovoltaic cell 26 can be represented by an equivalent circuit including a current source 21, a p-n junction diode 22, a shunt resistor 23, and a series resistor 24. The current source 21 supplies a current in proportion to the irradiation.

Figure 3:
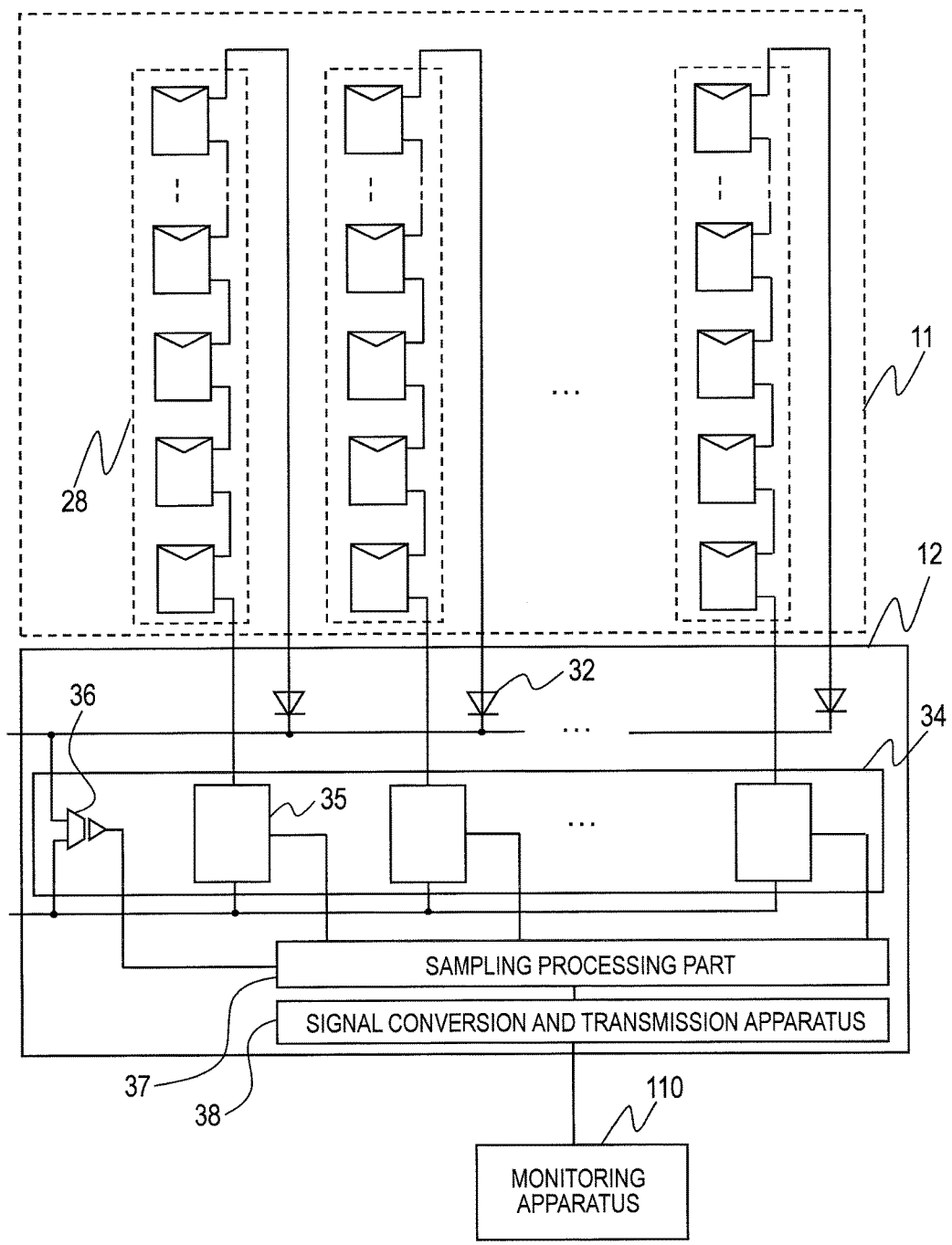
FIG. 3 is a diagram illustrating a configuration for monitoring photovoltaic string characteristics in a junction box of a photovoltaic system according to each of the embodiments.

FIG. 3 schematically illustrates a configuration example of the junction box 12 and a plurality of the photovoltaic strings 28 connected to the junction box 12. The plurality of photovoltaic strings 28 are connected to the junction box 12 in parallel to each other. A backflow preventing diode 32 for preventing a current from flowing in the opposite direction is mounted to each of the photovoltaic strings 28.

The junction box 12 includes a string measurement apparatus 34. The string measurement apparatus 34 includes a plurality of string current measurement apparatus 35 and a voltage measurement apparatus 36. Each of the string current measurement apparatus 35 measures a DC current flowing through a corresponding one of the photovoltaic strings 28. The voltage measurement apparatus 36 measures DC voltages of the photovoltaic strings 28. The DC voltages of the plurality of photovoltaic strings 28 are the same.

The junction box 12 further includes a sampling processing part 37 and a signal conversion and transmission apparatus 38. The sampling processing part 37 performs sampling processing on the DC voltage value measured by the string measurement apparatus 34 and the DC current values of the respective photovoltaic strings 28. The signal conversion and transmission apparatus 38 performs parallel-serial conversion on the outputs from the sampling processing part 37 and transmits the results of conversion to the monitoring apparatus 110.

Figure 4A:
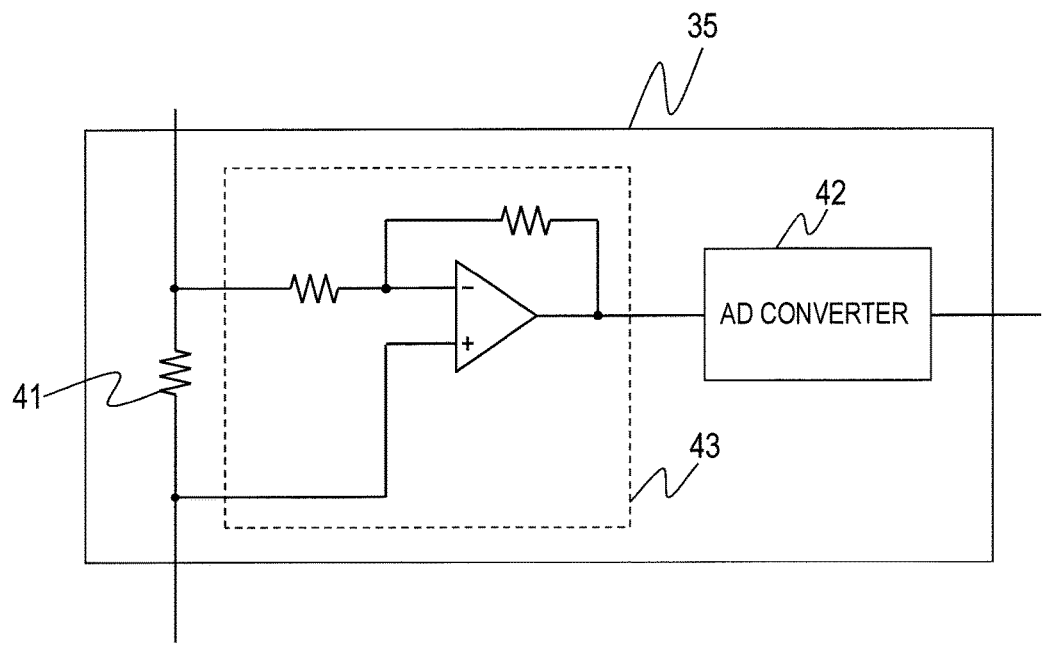
FIG. 4A is a diagram illustrating an example of a configuration for detecting a current flowing through the photovoltaic string according to each of the embodiments.

FIG. 4A schematically illustrates a configuration example of the string current measurement apparatus 35. The string current measurement apparatus 35 includes a shunt resistor 41 which converts a current flowing through the photovoltaic string 28 into a voltage. An inverting amplifier circuit 43 amplifies the voltage signal obtained by the conversion by the shunt resistor 41 to a level processable by an AD convertor 42. A lowpass filter is provided to an input of the AD converter 42 to remove a ripple component or a high-frequency component of thermal noise of the shunt resistor 41.

Figure 4B:
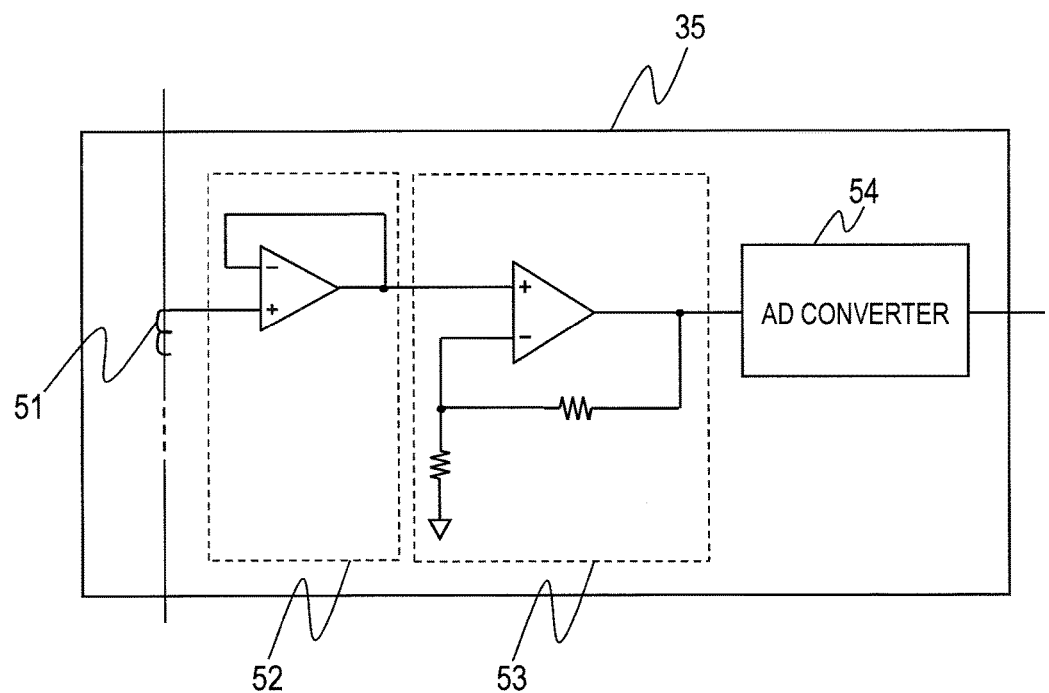
FIG. 4B is a diagram illustrating another example of the configuration for detecting the current flowing through the photovoltaic string according to each of the embodiments.

FIG. 4B schematically illustrates another configuration example of the string current measurement apparatus 35. In this configuration example, the string current measurement apparatus 35 includes a CT sensor 51 and a buffer 52. The CT sensor 51 converts the current flowing through the photovoltaic string 28 into the voltage. Then, the buffer 52 performs impedance conversion on the voltage. A non-inverting amplifier circuit 53 amplifies the voltage signal from the buffer 52 to a level processable by an AD converter 54.

The number of the pyranometer 101 and the number of the thermometer 102 installed in the mega solar power generation site are normally one for each, but are sometimes three to four. The large-scale photovoltaic system is provided on a land having a large area, and hence an irradiation distribution is generated. Therefore, the irradiation measured by the pyranometer 101 is not always the same as that on the photovoltaic array 16 provided in a certain section. Moreover, the pyranometer 101 requires several seconds of response time to a change in irradiation. The length of response time becomes a factor of an irradiation measurement error.

Further, the temperature measured by the thermometer 102 and a temperature at which the photovoltaic array 16 actually operates (operating temperature of the photovoltaic array 16) differ from each other. For example, in JIS C 8907, there is disclosed a method of estimating the temperature of the photovoltaic array 16 of support-structure installation type as a temperature obtained by adding 18.4° C. to the temperature measured by the thermometer 102. However, the estimating method has low accuracy, which in turn becomes a factor of a temperature measurement error.

Based on the above-mentioned facts, in order to realize accurate failure diagnosis for the photovoltaic system, especially for the large-scale photovoltaic system, it is important to determine the irradiation on and the operating temperature of the photovoltaic array 16 with higher accuracy by a method without using the pyranometer 101 and the thermometer 102. As such a method, it is effective to estimate the irradiation and the photovoltaic array temperature from the measured DC voltage value and DC current value of the photovoltaic array 16.

Figure 5A:
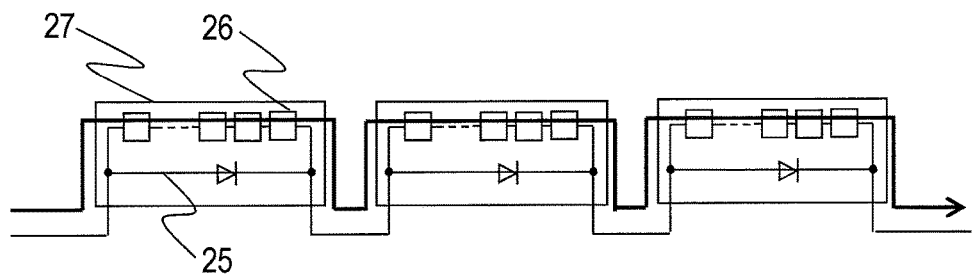
FIG. 5A is a diagram illustrating a current path in case of failure of a photovoltaic module according to each of the embodiments.
Figure 5B:
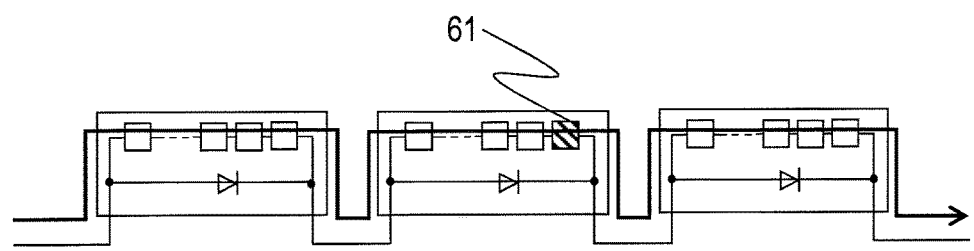
FIG. 5B is another diagram illustrating the current path in case of failure of the photovoltaic module according to each of the embodiments.
Figure 5C:
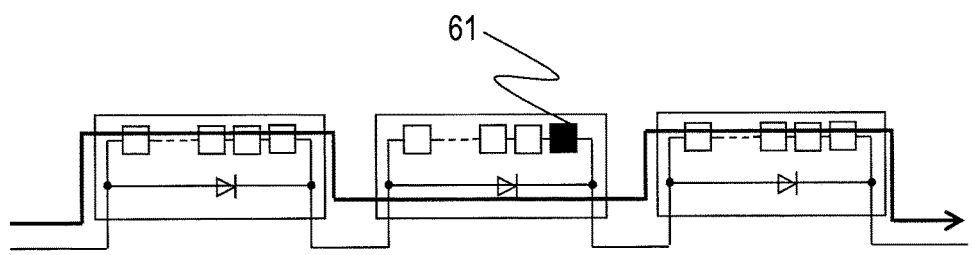
FIG. 5C is a further diagram illustrating the current path in case of failure of the photovoltaic module according to each of the embodiments.

Next, referring to FIGS. 2, 5A to 5C, and 6, a process in which a failure of the photovoltaic module 27 is caused is described. The failure of the photovoltaic module 27 progresses in such a mechanism as illustrated in FIGS. 5A to 5C.

As illustrated in FIG. 5A, the photovoltaic module 27 includes the plurality of photovoltaic cells 26 connected in series. Soldering is used to connect the photovoltaic cells 26 to each other. If the solder peel-off occurs between the photovoltaic cells 26, a wiring resistance component as the series resistor 24 in the photovoltaic cell 26, which is illustrated in FIG. 2, increases. Specifically, a wiring resistance component of the photovoltaic module 27 increases. As a result, a state of the photovoltaic module 27 transitions from a normal state illustrated in FIG. 5A to a state illustrated in FIG. 5B where a hot spot 61 is formed.

The state where the hot spot 61 is formed corresponds to a state where the solder peel-off from the photovoltaic cell 26 or the like occurs and a portion in which the solder peel-off occurs has a higher temperature than in a peripheral portion. A failure diagnosis using a thermocamera or the like is employed as a general method for detecting the hot spot.

When a larger amount of solder peel-off occurs, the value of the wiring resistance component (series resistor 24) of the photovoltaic cell 26 further increases. As a result, current drive capability of the photovoltaic module 27 having the hot spot 61 remarkably drops to operate the bypass diode 25. FIG. 5C illustrates a state where the bypass diode 25 operates.

The above-mentioned state is generally diagnosed by observing heat generation from a junction box in which the bypass diode 25 is mounted. Specifically, if the wiring resistance of the faulty photovoltaic module 27 increases, the current starts flowing via the bypass diode 25 at a certain point of time.

Figure 6:
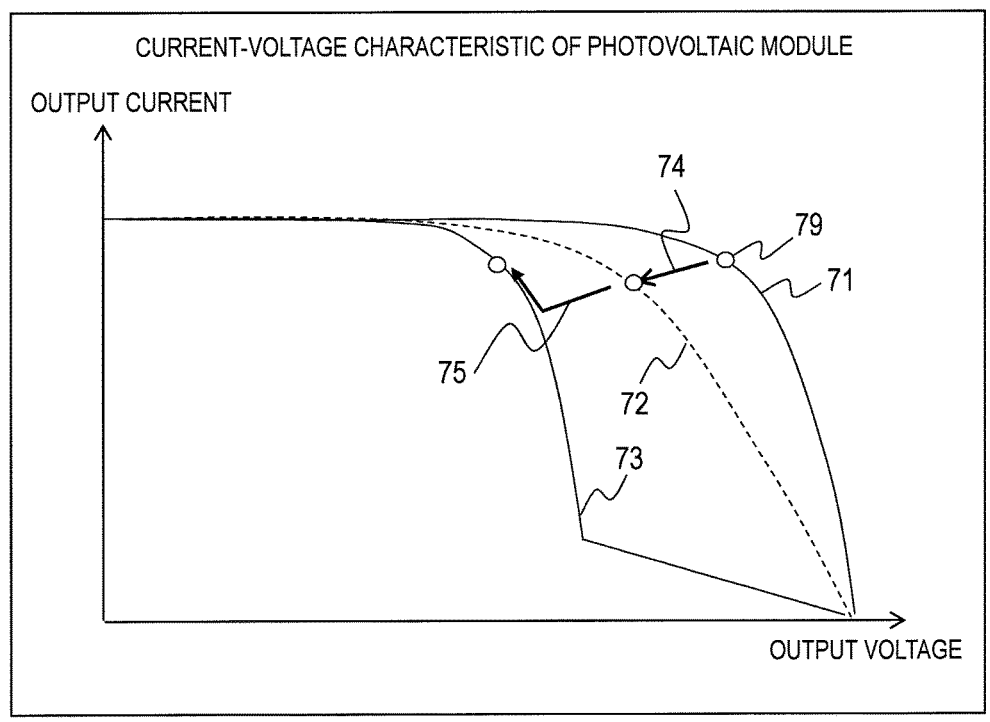
FIG. 6 is a graph showing a characteristic change in case of failure of the photovoltaic module according to each of the embodiments.

FIG. 6 shows a change in current-voltage characteristic (relationship between the output current and the output voltage) corresponding to the state change of the photovoltaic module 27, which is illustrated in FIGS. 5A to 5C. It is supposed that the irradiation and the operating temperature are constant. As the wiring resistance component increases, the current-voltage characteristic of the photovoltaic module 27, which is originally as represented by a curve 71, changes as represented by a curve 72.

If the wiring resistance component of the photovoltaic module 27 further increases to operate the bypass diode 25, the current-voltage characteristic of the photovoltaic module 27, which is represented by the curve 72, changes as represented by a curve 73. The curve 73 represents the current-voltage characteristic in which the voltage shifts while keeping the normal state and a maximum operating current. In the process in which the current-voltage characteristic changes from the curve 71 through the curve 72 to the curve 73, a maximum power point 79 changes as indicated by arrows 74 and 75.

A method of calculating (estimating) the irradiation on the photovoltaic string 28 and the operating temperature of the photovoltaic string 28 from the measurement values by the power conditioner system 13 is described below. The irradiation to be calculated is an irradiation per unit area. When the configurations of all the photovoltaic strings 28 are the same, the estimated irradiation and the estimated operating temperature are the same for all the photovoltaic strings 28 of the photovoltaic array 16.

Figure 7A:
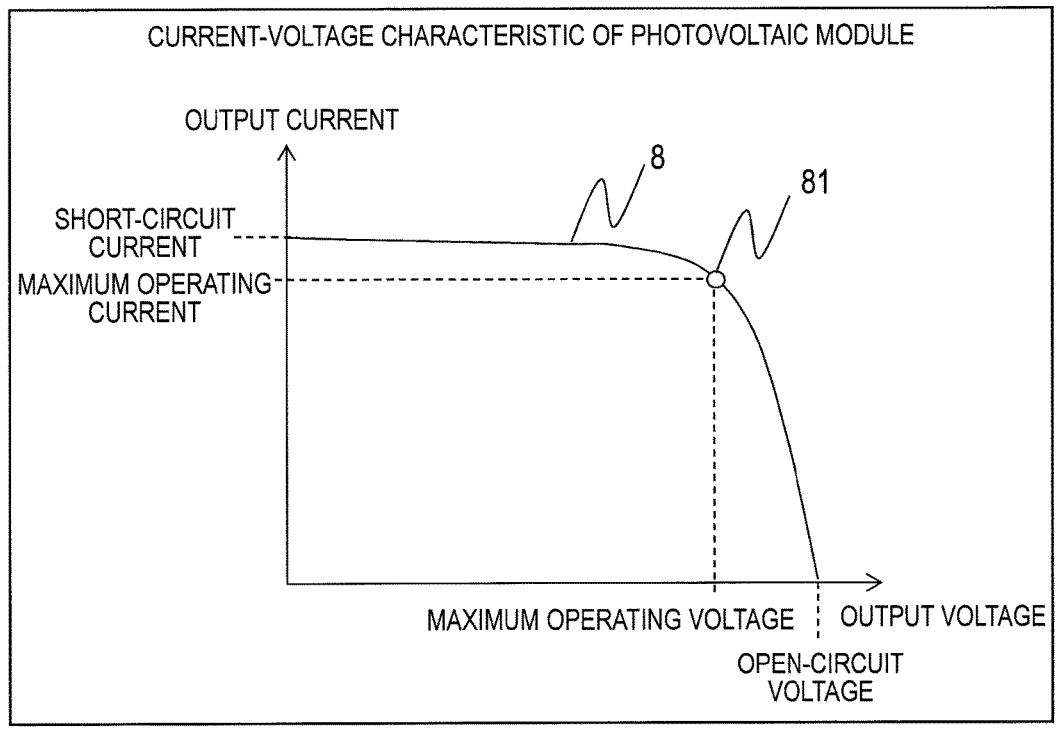
FIG. 7A is a graph showing a correlation between an output current and an output voltage of the photovoltaic module according to each of the embodiments.

A curve 8 shown in FIG. 7A represents a static characteristic of the photovoltaic module 27. A current at the time when the output voltage of the photovoltaic module 27 is zero, specifically, when two ends of the photovoltaic module 27 are short-circuited is referred to as "short-circuit current". On the other hand, a voltage at the time when the output current of the photovoltaic module 27 is zero, specifically, when the two ends of the photovoltaic module 27 are opened is referred to as "open-circuit voltage". The output current and the output voltage at an operating point 81 at which the maximum power of the photovoltaic module 27 can be extracted are respectively referred to as "maximum operating current" and "maximum operating voltage".

Figure 7B:
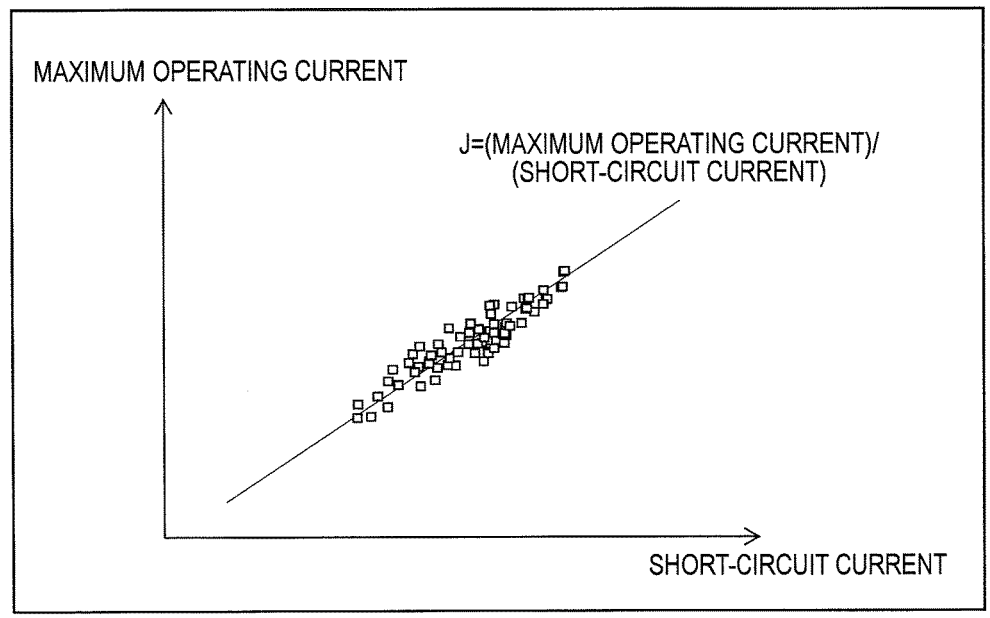
FIG. 7B is another graph showing a correlation between a short-circuit current and an operating current according to each of the embodiments.

The inventors evaluated several tens of thousands of 100-watt to 200-watt class photovoltaic modules constructing the large-scale photovoltaic system. As a result, the inventors found that the photovoltaic module 27 had an extremely high degree of correlation between the maximum operating current and the short-circuit current independently of the type of the photovoltaic module 27 and the variation during manufacturing, as shown in FIG. 7B.

Further, the inventors found that a ratio J of the maximum operating current to the short-circuit current (maximum operating current/ short-circuit current) of the photovoltaic module 27 was kept substantially constant within an irradiation range of from 0.1 kilowatt/m$^2$ to 1.0 kilowatt/m$^2$ in which the MPPT control is performed and a temperature range for actual use. The ratio J of the maximum operating current to the short-circuit current is kept constant during the MPPT control even in the photovoltaic string 28 and the photovoltaic array 16. The ratio J of the maximum operating current to the short-circuit current of the photovoltaic module 27 is herein also referred to as "predetermined coefficient" in some cases.

As described above, the ratio J of the maximum operating current to the short-circuit current of the photovoltaic module 27 is substantially constant independently of the irradiation and the operating temperature. In the case where a failure or degradation occurs or a light illumination effect is generated in the photovoltaic module 27 as illustrated in FIG. 6, however, the ratio J of the photovoltaic module 27 changes. The change in the ratio also occurs in the photovoltaic string 28 including the faulty photovoltaic module 27.

Figure 8:
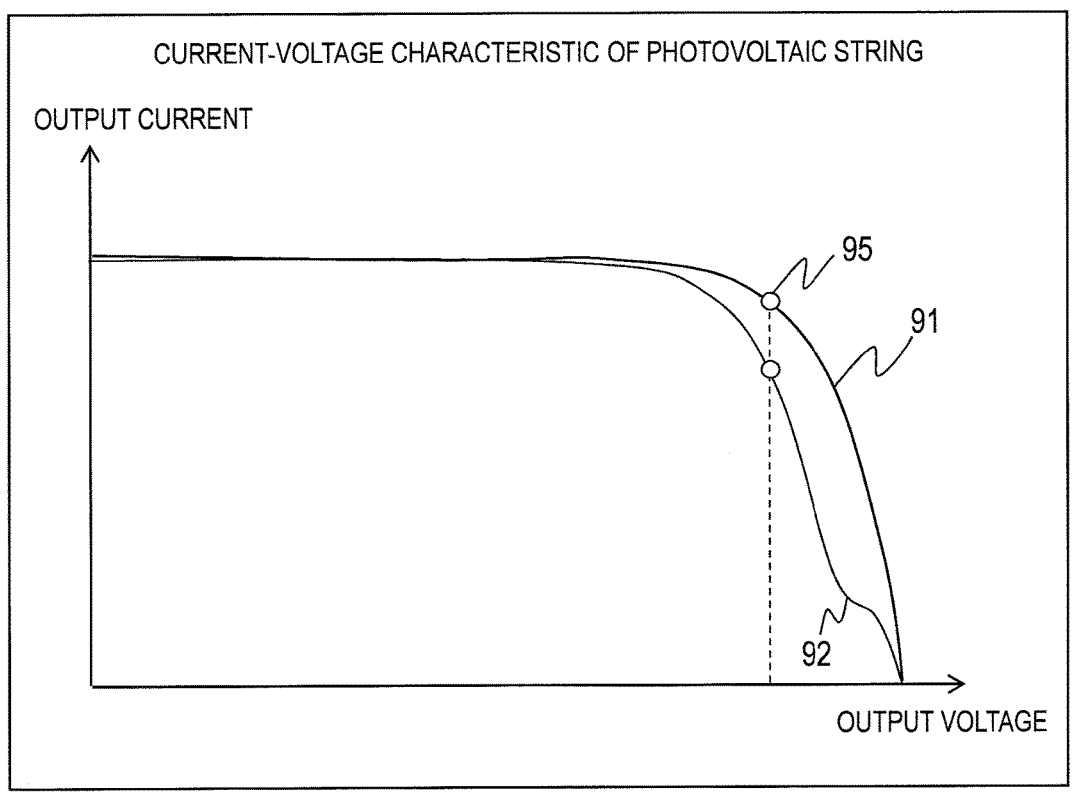
FIG. 8 is a graph showing a characteristic change of the photovoltaic string in case of failure of one of the photovoltaic modules included in the photovoltaic string according to each of the embodiments.

FIG. 8 shows a change in the current-voltage characteristic of the photovoltaic string 28 in the case where a disconnection occurs in one photovoltaic module 27 of the photovoltaic string 28 including fourteen photovoltaic modules 27 as an example. The current-voltage characteristic of the photovoltaic string 28, which is originally represented by a curve 91, changes as represented by a curve 92 due to the disconnection in the one photovoltaic module 27.

As a result, the ratio J of the maximum operating current to the short-circuit current of the photovoltaic string 28 changes. If the operating voltage of the photovoltaic array 16 does not change from the voltage value at a maximum power point 95 on the curve 91, the output current of the photovoltaic string 28 drops.

At the level of the output of the photovoltaic array 16, which is collected in the power conditioner system 13, however, the effects of the output drop of the photovoltaic module 27 on the output of the photovoltaic array 16 are small. Further, the photovoltaic string 28 which includes the faulty photovoltaic module 27 is found in early stage. In view of the facts described above, the ratio J of the maximum operating current to the short-circuit current of the photovoltaic array 16 may be considered as being kept constant.

Based on the relationship described above, the monitoring apparatus 110 calculates the estimated irradiation on the photovoltaic string 28 from the maximum operating current of the photovoltaic array 16, which is measured by the power conditioner system 13. The estimated irradiation to be calculated indicates a value per unit area.

In the following example, an average value of the maximum operating currents of the photovoltaic strings 28 is calculated from the measurement value of the maximum operating current of the photovoltaic array 16, whereas the irradiation on the photovoltaic string 28 is estimated from the maximum operating current value of the photovoltaic string 28.

Further, the monitoring apparatus 110 uses the maximum operating voltage of the photovoltaic array 16, which is measured by the power conditioner system 13, to calculate an estimated operating temperature of the photovoltaic string 28 (photovoltaic array 16). The maximum operating voltage of the photovoltaic array 16 is the same as the operating voltage to be applied to the photovoltaic strings 28. The monitoring apparatus 110 uses the calculated estimated irradiation and estimated operating temperature for the failure diagnosis of each of the photovoltaic strings 28.

The maximum operating current of the photovoltaic strings 28, which is calculated from the maximum operating current of the photovoltaic array 16 measured in the power conditioner system 13, is defined as Ipmax_b. A value of Ipmax_b is obtained by dividing the measurement value of the maximum operating current of the photovoltaic array 16 by the number of photovoltaic strings 28.

The short-circuit current and the maximum operating current of the photovoltaic strings 28 in a standard state are respectively defined as Isc_0 and Ipmax_0. The standard state corresponds to a state with the irradiation of 1.0 kilowatt/m$^2$ at the operating temperature of 25° C. Further, Isc_0 and Ipmax_0 are preset rated values.

Further, the estimated operating temperature and the estimated irradiation at the time of measurement of the maximum operating current Ipmax_b are respectively defined as Tb and pb. The estimated irradiation pb can be calculated appropriately by using Expressions (1) and (2).

$$J = \text{Ipmax\_0}/\text{Isc\_0} \quad (1)$$

$$pb = (\text{Ipmax\_b}/J)/\text{Isc\_0} \quad (2)$$

A method of calculating the estimated operating temperature Tb is described later. Expressions (1) and (2) hold even for the photovoltaic module 27 and the photovoltaic array 16. In Expression (2), Isc_0 is used as an approximate value of the short-circuit current with the irradiation of 1.0 kilowatt/m² at the estimated operating temperature Tb.

Here, the relationship between the output current I and the output voltage V of the photovoltaic module 27 including Ncell photovoltaic cells can be expressed by Expression (3).

$$I = \text{Isc\_0} \cdot p - \text{Is} \cdot \{\exp(q \cdot (V/(\text{Ncell}) + \text{Rs} \cdot I)/(nf \cdot k \cdot T))\} - (V/(\text{Ncell}) + \text{Rs} \cdot I)/\text{Rsh} \quad (3)$$

In Expression (3), I is the output current [A], Isc_0 is the short-circuit current [A] in the standard state, p is the irradiation [kilowatt/m²], Is is a saturation current [A] in the opposite direction and is a function of the operating temperature T, V is the output voltage [V], T is the operating temperature [K], k is a Boltzmann constant [J/K], Rs is a wiring resistance value [Ω] of the photovoltaic cell 26, q is a charge amount [C] of an electron, Rsh is a shunt resistance value [Ω] of the photovoltaic cell 26, and nf is a junction constant. Expression (3) is also applicable to the photovoltaic string 28 by using the number of photovoltaic cells included in the photovoltaic string 28 as the number of photovoltaic cells of Ncell.

Next, a method of calculating the current-voltage characteristic of the photovoltaic array 16 is described. A calculation of the current-voltage characteristic of the photovoltaic array 16 is herein referred to as "array computation". The array computation is realized by the combination of a string analysis and an array analysis.

The string analysis is an analysis of the photovoltaic string 28. In the string analysis, the currents I flowing through the plurality of photovoltaic modules 27 included in the photovoltaic string 28 are the same. When the current I flows through the photovoltaic string 28, the monitoring apparatus 110 can obtain voltages V[1], V[2], V[3], . . . V[N−1], and V[N] of the respective photovoltaic modules 27 by using Expression (3).

A sum of the voltages V of all the photovoltaic modules 27 is a voltage Vstring of the photovoltaic string 28. The monitoring apparatus 110 can calculate the current-voltage characteristic of the photovoltaic string 28 by changing a value of the current I flowing through the photovoltaic modules 27.

Expression (3) is an inverse function of the output voltage V. The monitoring apparatus 110 can easily obtain the output voltage V from Expression (3) by using a repeated operation, for example, the Newton method. As described above referring to FIG. 6, if the solder peel-off or the disconnection occurs in the photovoltaic module 27, the output voltage (module voltage) of the photovoltaic module 27 drops from the module voltage in the normal state. When the disconnection occurs in the photovoltaic module 27, the bypass diode 25 operates. Therefore, the module voltage can be approximated as zero.

The array analysis is an analysis of the photovoltaic array 16. In the array analysis, the voltages applied to the plurality of photovoltaic strings 28 included in the photovoltaic array 16 are the same. When the voltage V is applied to the photovoltaic array 16 (each of the photovoltaic strings 28), the monitoring apparatus 110 can obtain the currents I[1,] I[2 ]. . . I/[N] extracted from the respective photovoltaic strings 28 from the current-voltage characteristic obtained by the string analysis described above.

A sum of the output currents I of all the photovoltaic strings 28, which is calculated by the monitoring apparatus 110, is a current Iarray of the photovoltaic array 16. As described above, the array computation can obtain the current-voltage characteristic of the photovoltaic array 16 by the combination of the string analysis and the array analysis.

The monitoring apparatus 110 may calculate the current of the photovoltaic string 28 from Expression (3) for expressing the photovoltaic string 28.

A thermocouple, which is frequently used as a temperature sensor, generally has low measurement accuracy. The monitoring apparatus 110 calculates the estimated operating temperature of the photovoltaic string 28 from the maximum operating current Ipmax_b of the photovoltaic string 28, which is calculated from the maximum operating current of the photovoltaic array 16, and a maximum operating voltage Vpmax_b of the photovoltaic string 28, which are measured by the power conditioner system 13. The maximum operating current and the maximum operating voltage of the photovoltaic array 16, which are measured by the power conditioner system 13, are respectively also referred to as "PCS current" and "PCS voltage".

An open-circuit voltage Voc_b of the photovoltaic string 28 with the estimated irradiation pb at the estimated operating temperature Tb can be expressed by Expression (4) using the estimated irradiation pb, an open-circuit voltage Voc_a at an ambient temperature Ta which is a reference temperature, and a temperature coefficient β [volt/° C.] of the open-circuit voltage. The reference temperature of the open-circuit voltage is not required to be the ambient temperature.

$$\text{Voc\_}b = \text{Voc\_}a + \beta \cdot (\text{Tb} - \text{Ta}) \quad (4)$$

Through use of the above-mentioned coefficient J, Expression (5) is satisfied similarly at the estimated operating temperature Tb.

$$\text{Ipmax\_}b = J \cdot \text{Isc\_0} \cdot pb \quad (5)$$

The maximum operating voltage Vpmax_b and the open-circuit voltage Voc_b are respectively expressed by Expression (6) and Expression (7). In Expressions (6) and (7), Ncell is the number of photovoltaic cells included in the photovoltaic string 28.

$$\text{Vpmax\_}b = \text{Ncell} \cdot (nf \cdot k \cdot \text{Tb})/q \cdot \ln\{(\text{Isc\_0} \cdot pb - \text{Ipmax\_}b)/\text{Is}\} \quad (6)$$

$$\text{Voc\_}b = \text{Ncell} \cdot (nf \cdot k \cdot \text{Tb})/q \cdot \ln\{(\text{Isc\_0} \cdot pb)/\text{Is}\} \quad (7)$$

By combining Expression (6) and Expression (7) using the above-mentioned coefficient J, Expression (8) is satisfied.

$$\text{Vpmax\_}b - \text{Voc\_}b = \text{Ncell} \cdot ((nf \cdot k \cdot \text{Tb})/q) \cdot \ln(1-J) \quad (8)$$

By substituting Expression (4) into Expression (8), Expression (9) is obtained.

$$\text{Tb} = (\text{Vpmax\_}b - \text{Voc\_}a - \beta \cdot \text{Ta})/(\text{Ncell} \cdot (nf \cdot k/q) \cdot \ln(1-J) + \beta) \quad (9)$$

Specifically, the estimated operating temperature Tb of the photovoltaic string 28 can be calculated by using Expression (9) from the maximum operating voltage Vpmax_b that is measured by the power conditioner system 13 and the open-circuit voltage Voc_a with the estimated irradiation pb at the ambient temperature. The open-circuit voltage Voc_a can be obtained by, for example, calculating the sum of the module voltages obtained by substituting the estimated irradiation pb, the ambient temperature Ta, and the output current 0 into Expression (3).

Figure 9:
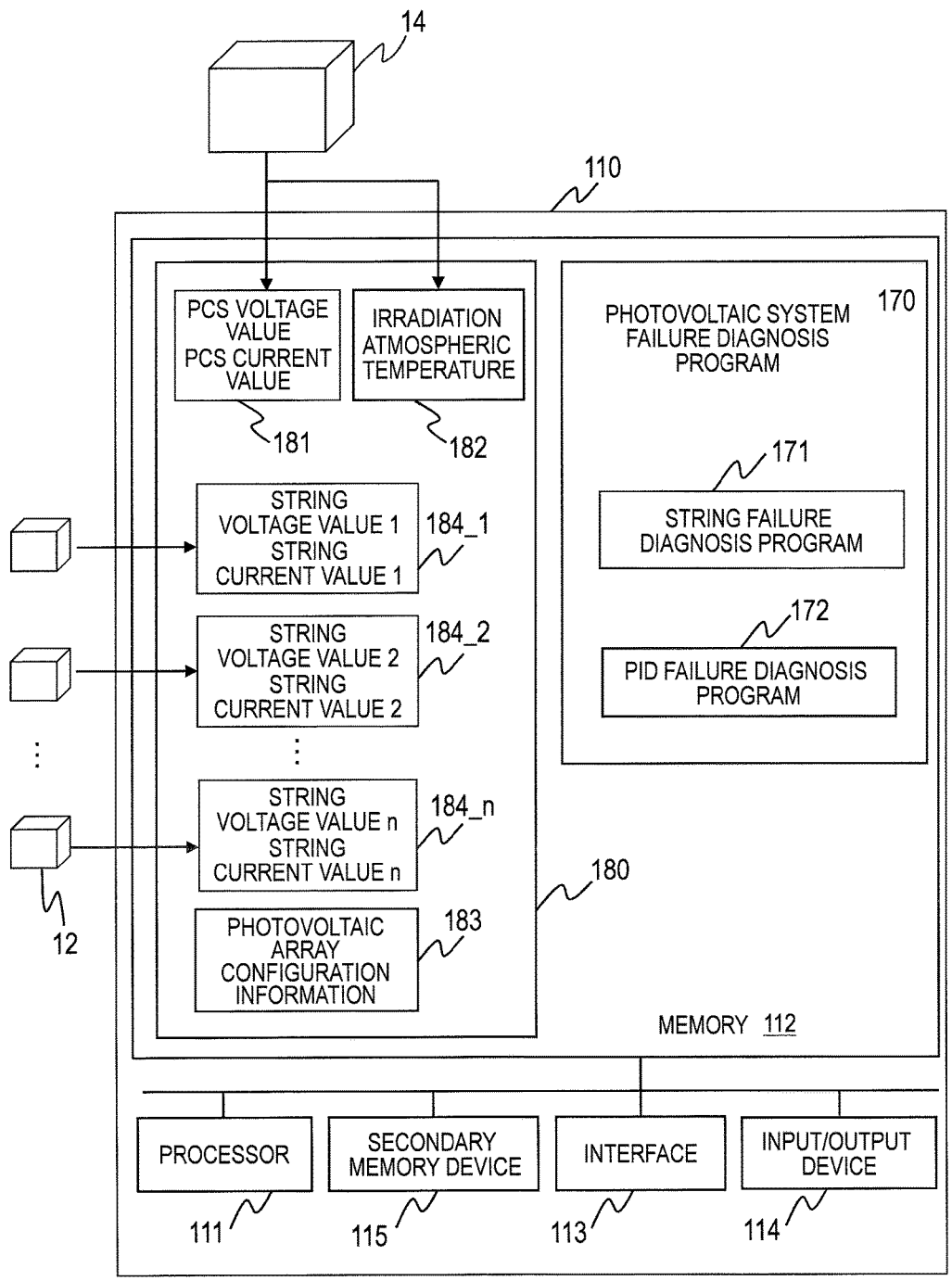
FIG. 9 is a diagram schematically illustrating a configuration example of a monitoring apparatus according to each of the embodiments.

FIG. 9 schematically illustrates a configuration example of the monitoring apparatus 110 according to the embodiments. The monitoring apparatus 110 has a configuration of a general computer. Specifically, the monitoring apparatus 110 includes a processor 111, a memory 112, an interface 113, an input/output device 114, and a secondary memory device 115. The above-mentioned components are connected to each other by a bus so as to enable communication therebetween. The input/output device 114 includes an input device and an output device.

The processor 111 realizes predetermined functions of the monitoring apparatus 110 by executing programs stored in the memory 112. The memory 112 stores the programs to be executed by the processor 111 and information necessary for the execution of the programs. As illustrated in FIG. 9, the memory 112 holds a photovoltaic system failure diagnosis program 170 and information 180 to be used by the photovoltaic system failure diagnosis program 170 in addition to an operating system (OS) (not shown).

The photovoltaic system failure diagnosis program 170 includes a string failure diagnosis program 171 and a potential induced degradation (PID) failure diagnosis program 172. An operation of the photovoltaic system failure diagnosis program 170 is described later. The information 180 contains PCS voltage value and PCS current value 181 and irradiation and atmospheric temperature information 182. The irradiation and atmospheric temperature information 182 indicates the measurement values by the pyranometer 101 and the thermometer 102.

The information 180 further contains measured current values and measured voltage values 184_1 to 184_n of the respective photovoltaic strings 28 and configuration information 183 of the photovoltaic array 16.

The monitoring apparatus 110 receives the PCS voltage value and PCS current value 181, and the irradiation and atmospheric temperature information 182 from the power conditioner system 13 through the interface 113. The monitoring apparatus 110 also receives the measured current values and measured voltage values 184_1 to 184_n of the respective photovoltaic strings 28 from the junction boxes 12 through the interface 113.

The photovoltaic array configuration information 183 contains information about the preset photovoltaic array 16. Specifically, the photovoltaic array configuration information 183 contains configuration information of each of the photovoltaic strings 28 included in the photovoltaic array 16. The configuration information of the photovoltaic string 28 contains information of rated values of the photovoltaic string 28 and those of each of the photovoltaic modules 27 included therein and information of the constant parameters used in Expressions (1) to (9). The photovoltaic array configuration information 183 may further contain information about a failure of each of the photovoltaic strings 28 and information of the number of effective cells in each of the photovoltaic strings 28.

Although the photovoltaic system failure diagnosis program 170 and the information 180 are illustrated in FIG. 9 as being present within the memory 112 for convenience of the description, the photovoltaic system failure diagnosis program 170 and the information 180 are typically loaded from the secondary memory device 115 into the memory 112. The secondary memory device 115 is a memory device including a non-volatile non-transitory storage medium which stores programs and information necessary for the realization of the predetermined functions of the monitoring apparatus 110. The secondary memory device 115 and the input/output device 114 may be coupled to each other through a network.

A program is executed by a processor, to thereby perform given processing with the use of a memory device and an interface. Accordingly, a description that has "program" as the subject can herein be read as a description with "processor" as the subject. In other words, processing executed by a program is processing performed by a computer and a computer system where the program is run.

FIRST EXAMPLE

Figure 10A:
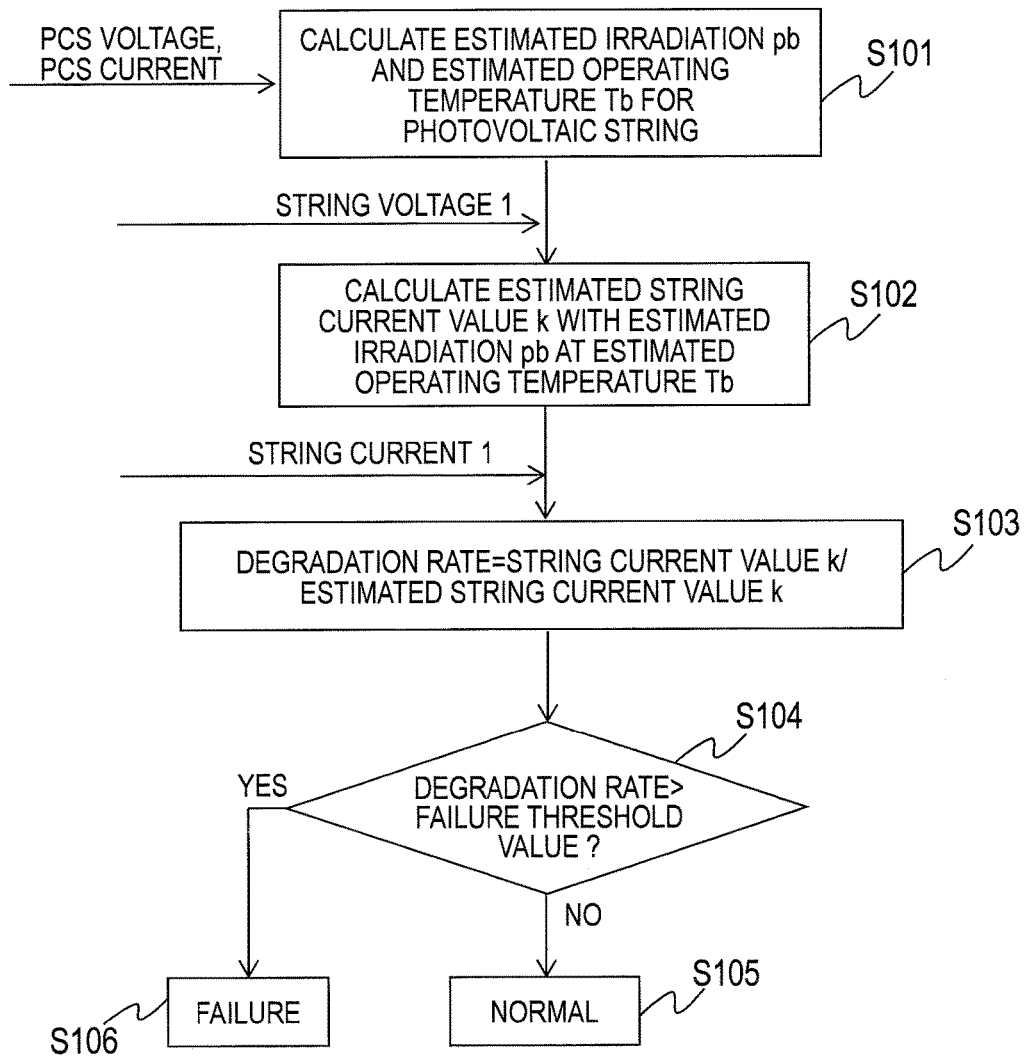
FIG. 10A is a flowchart illustrating the details of a principal part of an algorithm example for determining a failure of the photovoltaic string according to a first example.
Figure 10B:
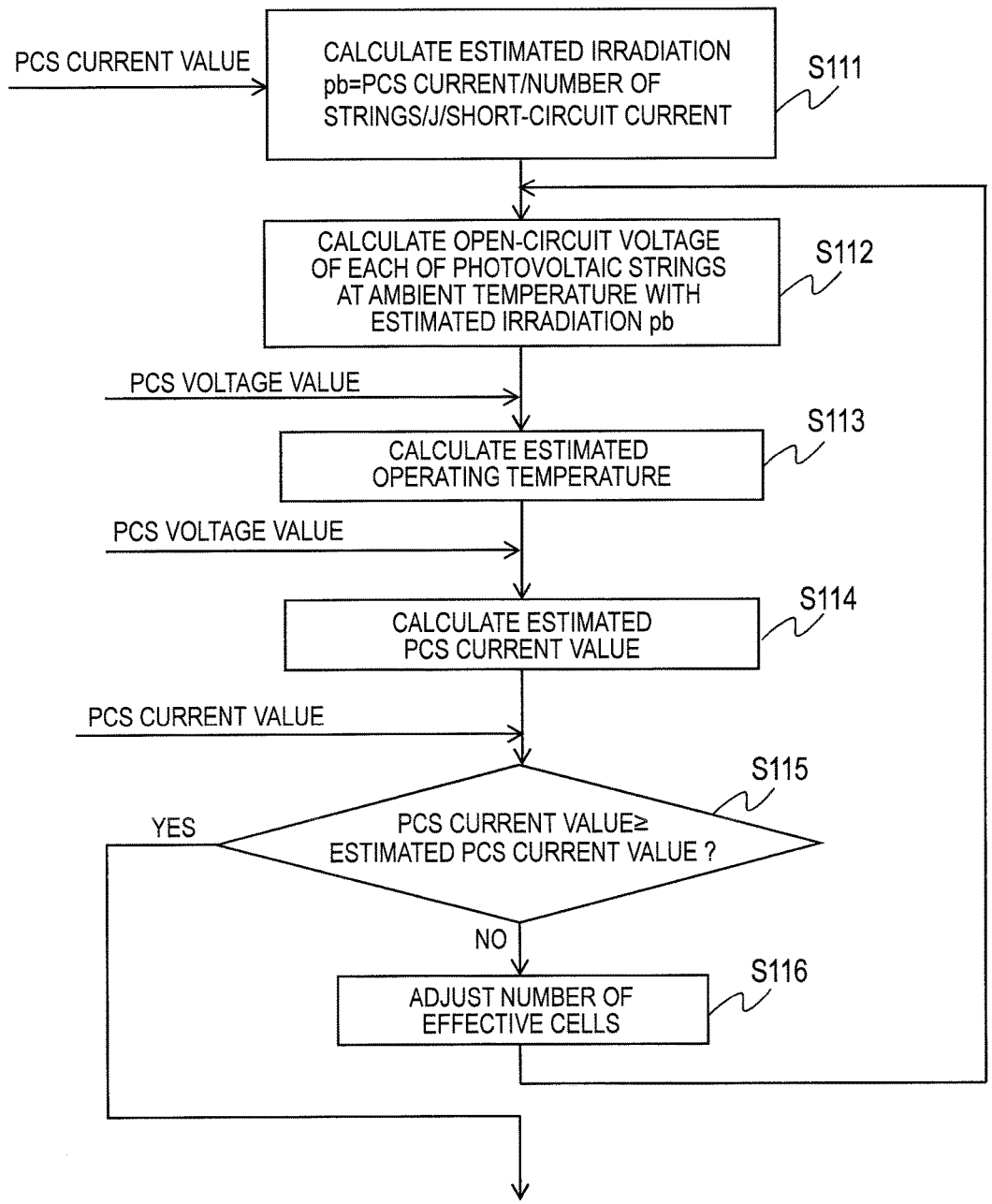
FIG. 10B is a flowchart illustrating the details of a processing example for calculating an irradiation on and an operating temperature of a photovoltaic array according to the first example.

An example of the failure diagnosis for the photovoltaic string 28 by the string failure diagnosis program 171 is now described below. FIG. 10A is an exemplary flowchart of determination of whether or not a failure of each of the photovoltaic strings 28 occurs by the string failure diagnosis program 171. FIG. 10B illustrates the details of Step S101 of FIG. 10A.

FIG. 10A illustrates a diagnosis for the single photovoltaic string 28, specifically, an example of the diagnosis for the photovoltaic string 28 identified by a string k. The string failure diagnosis program 171 executes the flow illustrated in FIG. 10A for each of the photovoltaic strings 28 included in the photovoltaic array 16. The string failure diagnosis program 171 monitors a failure of the photovoltaic array 16 and repeats the flow of FIG. 10A for each of the photovoltaic strings 28, for example, periodically.

As illustrated in FIG. 10A, the string failure diagnosis program 171 calculates the estimated irradiation pb on the photovoltaic string 28 and the estimated operating temperature Tb of the photovoltaic string 28 (S101).

As described above referring to Expressions (1) to (9), the string failure diagnosis program 171 can calculate the estimated irradiation pb and the estimated operating temperature Tb from the PCS current value and the PCS voltage value measured by the power conditioner system 13. As described above, the PCS current value and the PCS voltage value are respectively the maximum operating current and the maximum operating voltage of the photovoltaic array 16.

In the example described below, the monitoring apparatus 110 uses average values of the photovoltaic strings 28 included in the photovoltaic array 16 as the parameters in Expressions (1) to (9) for the calculation of the estimated irradiation pb and the estimated operating temperature Tb. Therefore, the estimated irradiation pb and the estimated operating temperature Tb, which are calculated for the photovoltaic string 28, are the same for all the photovoltaic strings 28 and the photovoltaic array 16. The details of Step S101 are described later referring to FIG. 10B.

Next, the string failure diagnosis program 171 uses the calculated estimated irradiation pb and estimated operating temperature Tb to calculate an estimated current value (estimated string current value k) of the string k which is the target photovoltaic string 28 to be diagnosed (S102).

For example, the string failure diagnosis program 171 substitutes the estimated irradiation pb and the estimated operating temperature Tb into Expression (3) to perform the above-mentioned string analysis, thereby calculating the estimated string current value k. The parameters in Expression (3) other than p and T are stored in the photovoltaic array configuration information 183. The parameters to be used are the parameters for the string k.

In the manner described above, the string failure diagnosis program 171 can obtain the current-voltage characteristic of the string k with the estimated irradiation pb at the estimated operating temperature Tb. The string failure diagnosis program 171 calculates the estimated string current value k from the obtained current-voltage characteristic and the PCS voltage value. In the case where the current-voltage characteristic expressed by Expression (3) is given in advance for the string k, Expression (3) can be used. This point also applies to the case described later where Expression (3) is used.

Next, the string failure diagnosis program 171 compares the measured current value for the string k (string current value k) and the estimated string current value k to determine a state of the estimated string current value k (S103). The measured current value for the string k is a value of the string current measured by the string current measurement apparatus 35 of the string k. In this example, the string failure diagnosis program 171 calculates a degradation rate of the string k by a ratio of the measured current value and the estimated current value of the string k.

Next, the string failure diagnosis program 171 compares the calculated degradation rate and a predetermined failure threshold value to determine whether or not the string k is faulty (S104). For example, a value of the failure threshold value is 2.0%. When the degradation rate is larger than the failure threshold value, the string failure diagnosis program 171 determines that the string k is faulty (S106). When the degradation rate is equal to or smaller than the failure threshold value, the string failure diagnosis program 171 determines that the string k is normal (S105).

When it is determined that the string k is faulty, the string failure diagnosis program 171 generates an image for presenting the failure of the string k and outputs the generated image to the input/output device 114. For example, the image may contain an identifier of the string k, information indicating the occurrence of the failure, and the degradation rate.

Referring to FIG. 10B, the details of Step S101 of FIG. 10A are described. As described above, in Step S101, the estimated irradiation pb on the photovoltaic string 28 and the estimated operating temperature Tb of the photovoltaic string 28 are calculated. As described above, the parameters used in each of the Expressions are the average values of the photovoltaic strings 28 included in the photovoltaic array 16. The monitoring apparatus 110 may use other parameters common to the photovoltaic strings 28 included in the photovoltaic array 16.

As illustrated in FIG. 10B, the string failure diagnosis program 171 calculates the estimated irradiation pb from the PCS current value (S111). The string failure diagnosis program 171 divides the PCS current value by the number of photovoltaic strings to calculate an average maximum operating current value of the photovoltaic strings 28. The string failure diagnosis program 171 substitutes the calculated average maximum operating current value into Ipmax_b in Expression (2) to calculate the estimated irradiation pb on each of the photovoltaic strings 28.

Next, the string failure diagnosis program 171 calculates the open-circuit voltage Voc_a of each of the photovoltaic strings 28 with the estimated irradiation pb at the ambient temperature (S112). The string failure diagnosis program 171 substitutes the estimated irradiation pb and the ambient temperature Ta into Expression (3) to calculate the open-circuit voltage of the photovoltaic module 27 with I=0. From the values of the open-circuit voltages, the open-circuit voltage Voc_a of the photovoltaic string 28 can be calculated.

Next, the string failure diagnosis program 171 calculates the estimated operating temperature Tb of each of the photovoltaic strings 28 from Expression (9) (S113). The string failure diagnosis program 171 uses the PCS voltage value as Vpmax_b and substitutes the PCS voltage value and the calculated estimated irradiation pb and open-circuit voltage Voc_a into Expression (9).

Next, the string failure diagnosis program 171 calculates an estimated PCS current value by Expression (3) and the array computation described above (S114). The string failure diagnosis program 171 calculates the estimated PCS current value by calculating the estimated string current value of the photovoltaic string 28 and then calculating a product of the calculated estimated string current value and the number of strings.

As described above, the string failure diagnosis program 171 can obtain the current-voltage characteristic of the photovoltaic string 28 with the estimated irradiation pb at the estimated operating temperature Tb by Expression (3) and the string analysis. The string failure diagnosis program 171 can calculate the estimated string current value from the obtained current-voltage characteristic and the PCS voltage value.

The string failure diagnosis program 171 compares the calculated estimated PCS current value and the measured PCS current value with each other (S115). When the measured PCS current is equal to or larger than the estimated PCS current value (S115: YES), the string failure diagnosis program 171 holds the estimated irradiation pb on the string k, which is calculated in Step S 111, and the estimated operating temperature Tb of the string k, which is calculated in Step S113, and then proceeds to subsequent Step S102.

When the measured PCS current is lower than the estimated PCS current value (S115: NO), the string failure diagnosis program 171 determines that the photovoltaic array 16 includes a large number of photovoltaic modules 27 in which a disconnection failure occurs and therefore adjusts the number of effective cells included in the photovoltaic array 16 (photovoltaic string 28) (S116). The string failure diagnosis program 171 may store the results of adjustment in the photovoltaic array configuration information 183.

The string failure diagnosis program 171 decreases the number of effective cells included in the photovoltaic array 16 by a predetermined number. In recalculation of the estimated irradiation pb, the estimated operating temperature Tb, and the estimated PCS current value, a value obtained by dividing the predetermined number by the number of strings can be used as a value indicating the number of cells to be decreased from the effective cells included in the photovoltaic string 28.

The string failure diagnosis program 171 returns to Step S112 to execute Steps S112 to S115 with the adjusted number of effective cells. The string failure diagnosis program 171 repeats Steps S112 to Step S116 until the PCS current value becomes equal to or larger than the estimated PCS current value.

The string failure diagnosis program 171 uses the adjusted number of effective cells in the calculation of the estimated irradiation pb and the estimated operating temperature Tb but does not use the adjusted number of effective cells in Step S102. The string failure diagnosis program 171 uses the unadjusted number of cells contained in the configuration information of the string k in the calculation of the estimated string current value k in Step S102.

As described above, Expressions (1) to (9) presuppose that the effects of the output drop of the photovoltaic module 27 on the output of the photovoltaic array 16 collected in the power conditioner system 13 are small. In case of disconnection failure of the photovoltaic module 27, however, the operation of the large number of photovoltaic cells 26 becomes ineffective as illustrated and shown in FIGS. 5C and 6. As a result, the characteristic change of the photovoltaic module 27 becomes greater. By adjusting the number of effective cells, the estimated operating temperature Tb can be more precisely calculated. Steps S114 to S116 may be omitted.

For the above-mentioned determination for the PCS current value, a value of the PCS current value per string may be used. In the calculation of the estimated irradiation pb and the estimated operating temperature Tb, the monitoring apparatus 110 may calculate the irradiation on and the operating temperature of each of the photovoltaic strings 28 by using intrinsic parameters of each of the photovoltaic strings 28 and then calculate the average values of the estimated irradiation pb and the estimated operating temperature Tb. In this case, the monitoring apparatus 110 may adjust the number of effective cells for each of the photovoltaic strings 28.

By the processing flow described above, the irradiation on and the operating temperature of the photovoltaic string can be estimated with good accuracy in this embodiment. Therefore, the degradation or failure of the photovoltaic string can be known with high accuracy.

SECOND EXAMPLE

Figure 11:
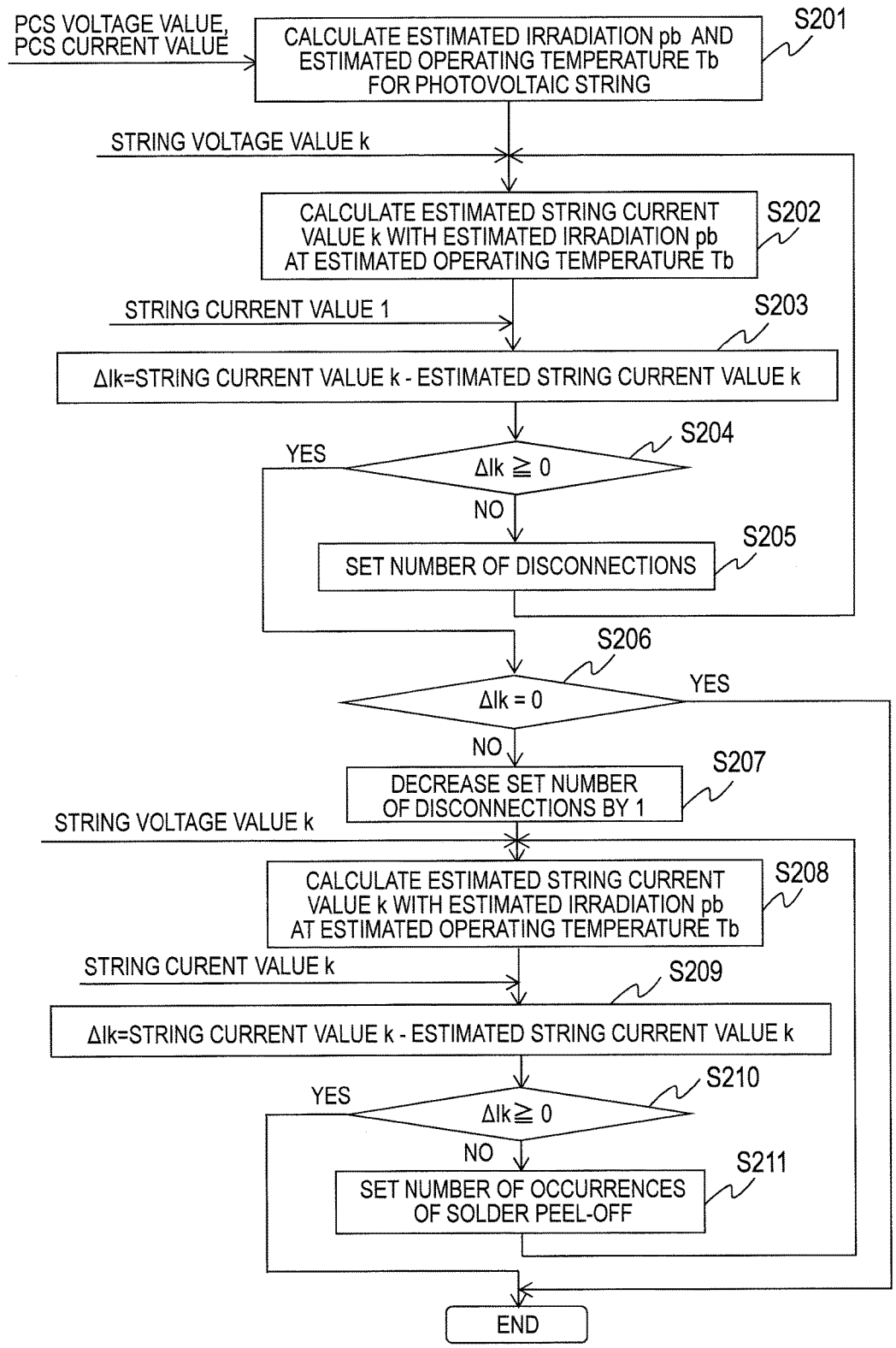
FIG. 11 is a flowchart illustrating a processing example in which the number of the faulty photovoltaic modules included in the photovoltaic string is calculated according to a second example.

Next, an example of determination of the number of faulty photovoltaic modules 27 included in the photovoltaic string 28 is described. FIG. 11 is a flowchart illustrating a method of calculating the number of faulty photovoltaic modules 27 included in the photovoltaic string 28. The string failure diagnosis program 171 operates in accordance with the flowchart of FIG. 11. The string failure diagnosis program 171 executes processing of the flowchart of FIG. 11 for, for example, the photovoltaic string 28 which is determined as being faulty in FIG. 10A.

As illustrated in FIG. 11, the string failure diagnosis program 171 calculates the estimated irradiation pb and the estimated operating temperature Tb for the target photovoltaic string 28 (string k) to be diagnosed (S201). Step S201 is similar to Step S101 of the processing illustrated in FIGS. 10A and 10B.

Next, the string failure diagnosis program 171 calculates the estimated current value of the string k (estimated string current value k) from the estimated irradiation pb and the estimated operating temperature Tb (S202). Step S202 is similar to Step S102 illustrated in FIG. 10A.

Next, as a first stage, the string failure diagnosis program 171 calculates the number of photovoltaic modules in which the disconnection occurs. First, the string failure diagnosis program 171 compares the string current value k measured by the string current measurement apparatus 35 and the estimated string current value k with each other and calculates a difference ΔIk therebetween (S203).

When the measured string current value k is smaller than the estimated string current value k, specifically, the difference ΔIk is smaller than 0 (S204: NO), the string failure diagnosis program 171 reduces the number of effective cells included in the string k by the number of photovoltaic cells constructing a selected predetermined number of the photovoltaic modules 27 (S205). For example, the number of effective cells included in the string k is reduced by the number of photovoltaic cells constructing one photovoltaic module 27. The predetermined number indicates the number of the photovoltaic modules 27 in which the disconnection occurs (the number of disconnections). The photovoltaic modules having different number of cells may be included in the photovoltaic string 28.

The string failure diagnosis program 171 executes Steps S202 to S204 with the reset number of effective cells. The string failure diagnosis program 171 repeats Steps S202 to S205 until the measured string current value k becomes equal to or larger than the estimated string current value k.

When the measured string current value k and the estimated string current value k match each other, specifically, the difference ΔIk is 0 (Step S204: YES, S206: YES), the string failure diagnosis program 171 terminates the flow.

When the measured string current value k is larger than the estimated string current value k, specifically, the difference ΔIk is larger than 0 (Step S204: YES, S206: NO), the string failure diagnosis program 171 decreases the set number of disconnections by 1 (S207). The string failure diagnosis program 171 selects one photovoltaic module from the photovoltaic modules 27 which are set as having the disconnection and increases the number of effective cells included in the string k by the number of cells included in the selected photovoltaic module 27.

The string failure diagnosis program 171 executes Steps S208 to S210 with the reset number of effective cells (number of valid modules). Steps S208 to S210 are respectively similar to Steps S202 to S204.

In Step S210, when the measured string current value k is equal to or larger than the estimated string current value k (S210: YES), the string failure diagnosis program 171 terminates the flow. On the other hand, when the measured string current value k is smaller than the estimated string current value k in Step S210 (S210: NO), the string failure diagnosis program 171 sets the number of occurrences of solder peel-off as a second stage (S211).

The string failure diagnosis program 171 increments the number of the photovoltaic modules 27 in which the occurrence of solder peel-off is estimated among the valid photovoltaic modules 27 selected in setting the number of disconnections and then returns to Step S208.

Here, the string failure diagnosis program 171 has in advance a value Rs1 of the series resistance value Rs (series resistor 24 illustrated in FIG. 2), which decreases the output current of the photovoltaic module 27 by a predetermined rate, for example, 10%, from Expression (3). The string failure diagnosis program 171 sets the series resistance value Rs of the photovoltaic module 27 in which the occurrence of solder peel-off is estimated to Rs1. The string failure diagnosis program 171 uses the value Rs1 as the series resistance value Rs of the photovoltaic module 27 in which the occurrence of solder peel-off is estimated in the calculation of Expression (3).

The string failure diagnosis program 171 repeats Steps S208 to S211 until the measured string current value k becomes equal to or larger than the estimated string current value k.

By the processing flow described above, the irradiation on and the operating temperature of the photovoltaic string can be estimated with good accuracy in the second example. As a result, the number of the faulty photovoltaic modules 27 included in the photovoltaic string 28 can be estimated.

THIRD EXAMPLE

A failure diagnosis method for the photovoltaic system 1 according to a third example of this invention is now described. In the third example, a case where a large number of operating points of the photovoltaic modules 27 constructing the photovoltaic array 16 greatly shift from the operating point during a normal operation due to the degradation of the photovoltaic cells 26, which is called "PID" is described. There are several possible factors of the occurrence of the PID. In any case, however, when recombination occurs in the p-n junction portion constructing the photovoltaic cell 26, the value of the shunt resistor 23 of the photovoltaic cell 26 decreases. As a result, the photovoltaic cell 26 becomes ohmic.

Figure 12A:
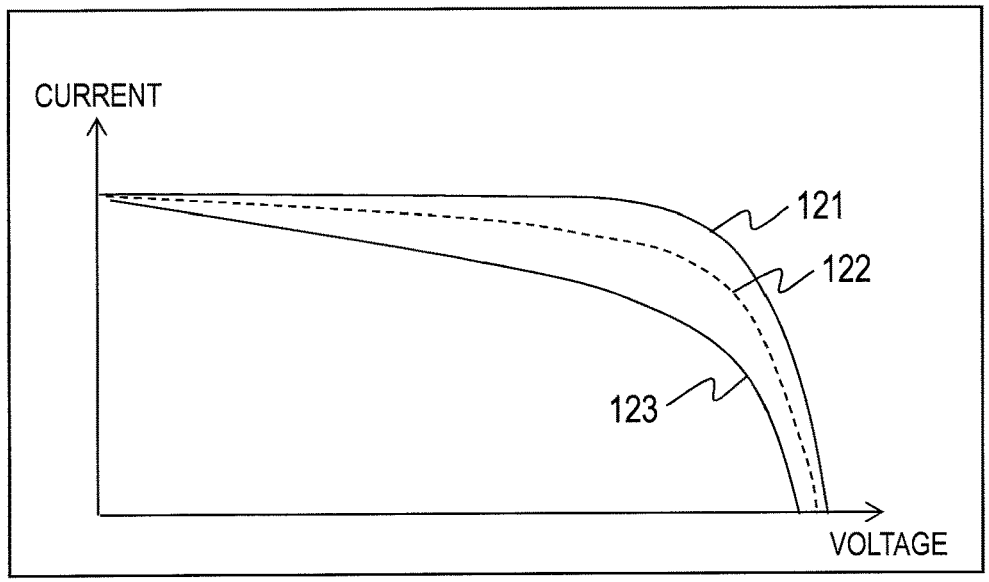
FIG. 12A is a graph showing a characteristic change in case of degradation of a photovoltaic cell included in the photovoltaic module under a large irradiation condition according to a third example.
Figure 12B:
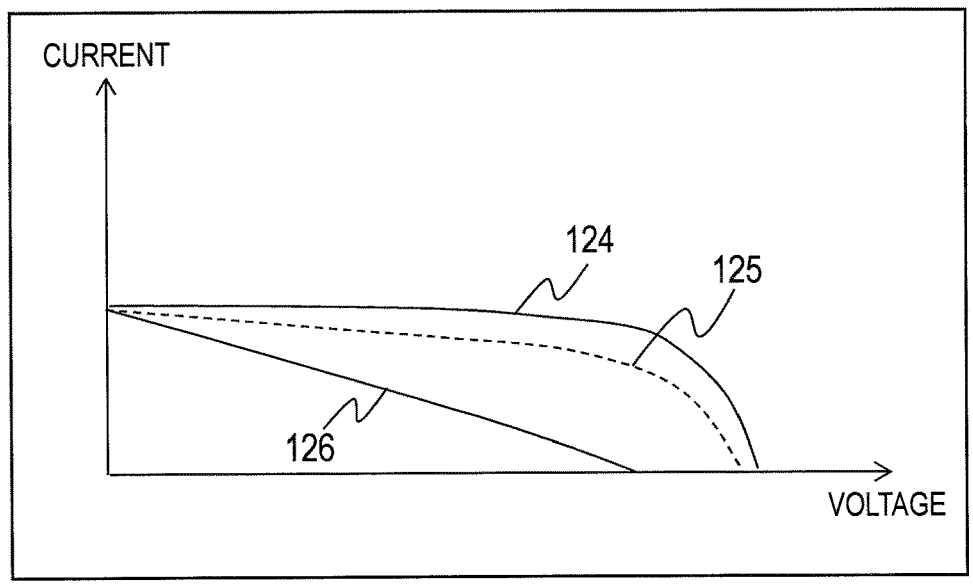
FIG. 12B is a graph showing a characteristic change in case of degradation of the photovoltaic cell included in the photovoltaic module under a small irradiation condition according to the third example.

When the shunt resistor decreases in the case where the irradiation is large, as shown in FIG. 12A, the current-voltage characteristic of the photovoltaic module 27, which is originally represented by a curve 121, changes as represented by a curve 122 and then changes as represented by a curve 123. In the case where the irradiation is small, as shown in FIG. 12B, a curve 124 representing the current-voltage characteristic of the photovoltaic module 27 changes to a curve 125 and then to a curve 126. Therefore, the shift of the operating point becomes greater as the irradiation becomes smaller.

Figure 13A:
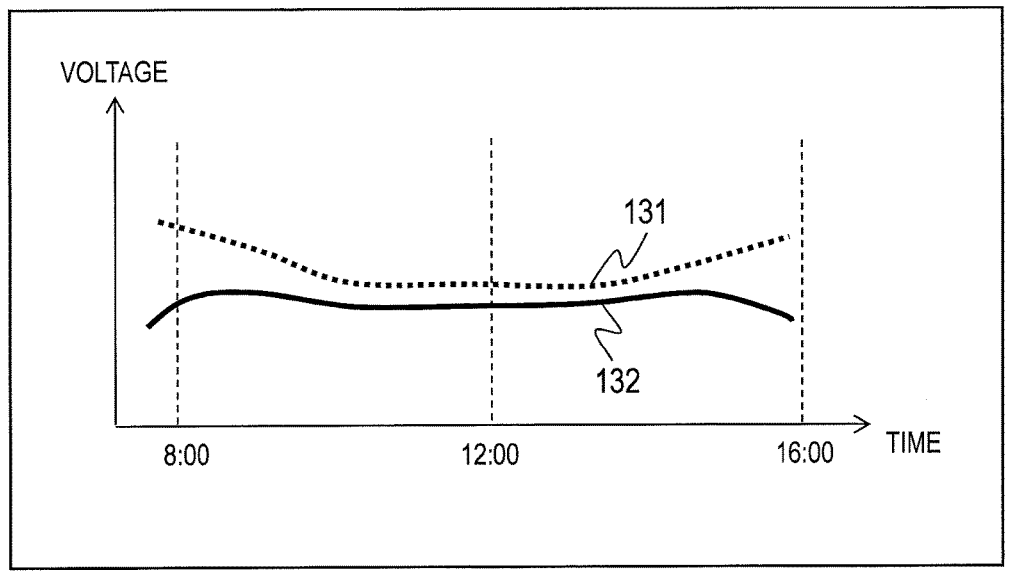
FIG. 13A is a graph showing a temporal change of a photovoltaic array operating voltage of the photovoltaic system in case of degradation of the photovoltaic cell included in the photovoltaic module according to the third example.
Figure 13B:
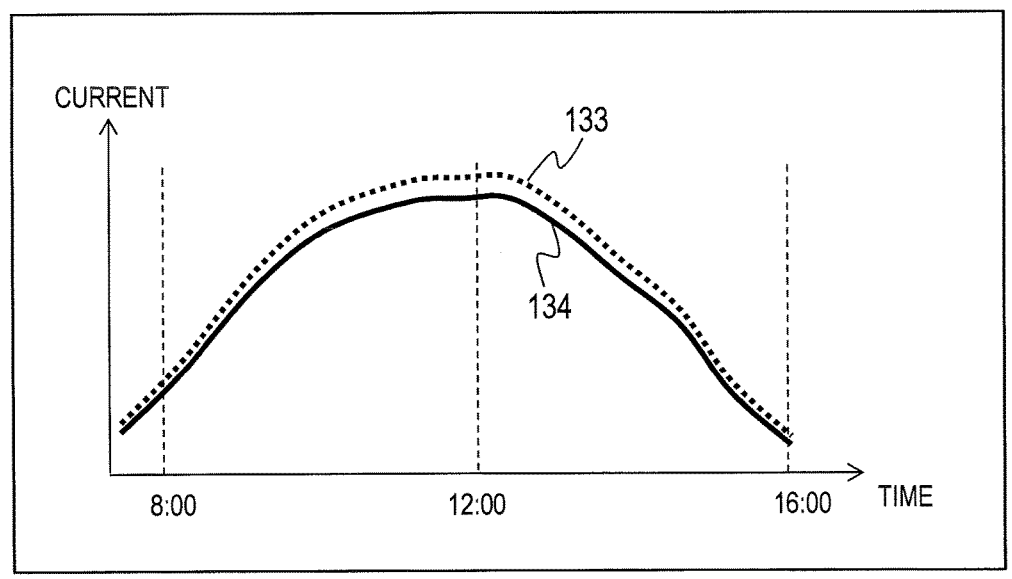
FIG. 13B is a graph showing a temporal change of a photovoltaic array operating current of the photovoltaic system in case of degradation of the photovoltaic cell included in the photovoltaic module according to the third example.
Figure 14:
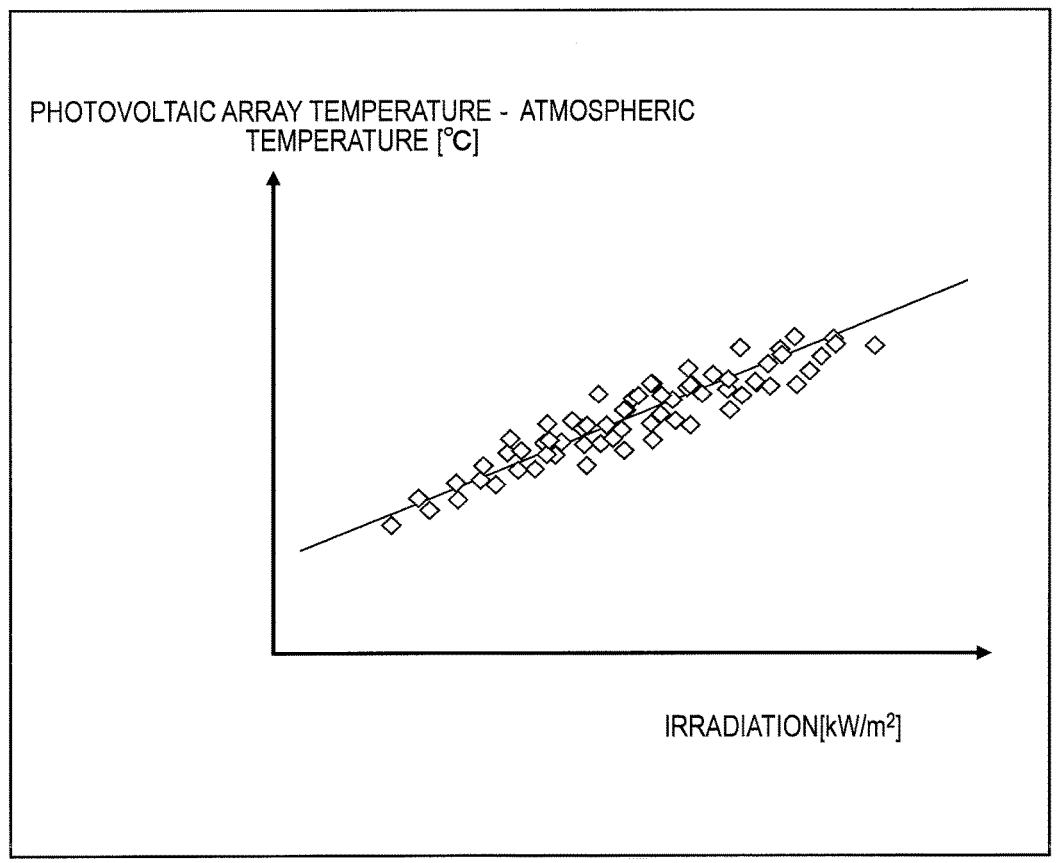
FIG. 14 is a graph showing a correlation between a value obtained by subtracting an atmospheric temperature from a photovoltaic array operating temperature and the irradiation according to the third example.

FIG. 13A shows a temporal change of the PCS voltage in the case where the photovoltaic cell 26 is becoming ohmic due to degradation, and FIG. 13B shows a temporal change of the PCS current. A curve 131 represents the PCS voltage during the normal operation, whereas a curve 132 represents the PCS voltage in case of degradation of the photovoltaic cell. Similarly, a curve 133 represents the PCS current during the normal operation, whereas a curve 134 represents the PCS current in case of degradation of the photovoltaic cell. As can be understood from the above-mentioned changes, both the maximum operating voltage and the maximum operating current change greatly as compared with those during the normal operation. Therefore, the value of J expressed by Expression (1) does not become constant.

As described above, if the characteristic change of the photovoltaic array 16 is large, the monitoring apparatus 110 uses the irradiation measured by the pyranometer 101 and the atmospheric temperature measured by the thermometer 102 as reference values. As described above, JIS C 8907 discloses the method of estimating the temperature obtained by adding 18.4° C. to the atmospheric temperature measured by the thermometer 102 as the photovoltaic array temperature for the photovoltaic array 16 of the support-structure installation type. However, the method provides low accuracy.

The inventors found through the evaluation of a power generation amount of the large-scale photovoltaic system 1 that a value obtained by subtracting the atmospheric temperature from the photovoltaic array temperature had a high degree of correlation with the irradiation. The relationship is expressed by Expression (10) as an example.

$$Tb-T1=26*p1+0.8 \qquad (10)$$

where T1 is the atmospheric temperature. As described above, the value obtained by subtracting the atmospheric temperature from the photovoltaic array temperature is approximated by a primary expression of the irradiation.

Specifically, when the irradiation measured by the pyranometer 101 is p1 and the atmospheric temperature measured by the thermometer 102 is T1, from Expression (10), the estimated operating temperature Tb of the photovoltaic array 16 (the respective photovoltaic strings 28) can be calculated with a certain degree of accuracy. In the case where a large number of the operating points of the photovoltaic modules 27 constructing the photovoltaic array 16 greatly shift from those during the normal operation, as in the case of the PID, the normal state and the output-drop state can be distinguished from each other even with the certain degree of accuracy without needing to be too high.

Figure 15:
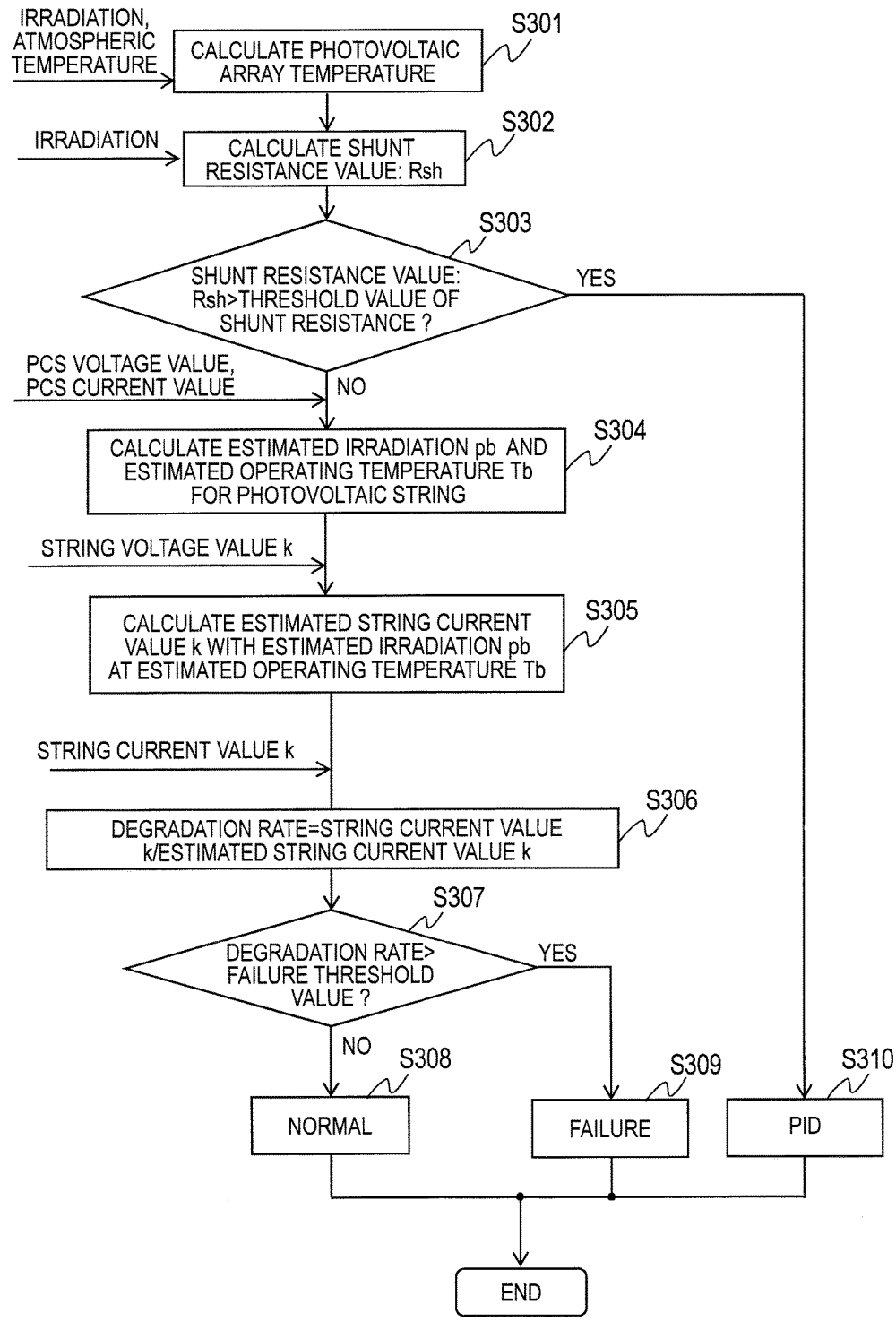
FIG. 15 is a flowchart illustrating a processing example for determining the failure of the photovoltaic string according to the third example.

FIG. 15 is a flowchart of an example of the failure diagnosis for the photovoltaic string 28 in view of the case where the characteristic of the photovoltaic array 16 greatly changes as in the case of the PID. The PID failure diagnosis program 172 and the string failure diagnosis program 171 operate in accordance with the flowchart of FIG. 15. The processing illustrated in the flowchart is executed, for example, periodically.

As illustrated in FIG. 15, the PID failure diagnosis program 172 obtains information of the irradiation measured by the pyranometer 101 and the atmospheric temperature measured by the thermometer 102 and calculates the estimated operating temperature Tb of the photovoltaic string 28 by using Expression (10) (S301).

The PID failure diagnosis program 172 further obtains the shunt resistance value Rsh of the photovoltaic cells 26 included in the photovoltaic module 27 by using the measured irradiation, the estimated operating temperature Tb, the string current value measured by the string current measurement apparatus 35, the PCS voltage value, and Expression (3) (S302). Here, it is supposed that the shunt resistance values of all the photovoltaic modules 27 included in the photovoltaic string 28 are the same.

The PID failure diagnosis program 172 holds a threshold value of the shunt resistor, which is used for the determination of the PID. The PID failure diagnosis program 172 compares the shunt resistance value Rsh with the threshold value (S303).

When the shunt resistance value Rsh is smaller than the threshold value (S303: YES), the PID failure diagnosis program 172 determines that the PID occurs in the photovoltaic string 28 (S310).

When the shunt resistance value Rsh is equal to or larger than the threshold value (S303: NO), the PID failure diagnosis program 172 invokes the string failure diagnosis program 171. The string failure diagnosis program 171 executes Steps S304 to S309. Steps S304 to S309 are respectively similar to Steps 101 to S106 of FIG. 10A.

According to the embodiments described above, the failure diagnosis can be realized at low costs in the large-size photovoltaic system without adding measurement means and communication means.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card. The drawings shows control lines and information lines as considered necessary for explanation but do not show all control lines or information lines in the products. It can be considered that almost of all components are actually interconnected.

What is claimed is:

1. A failure diagnosis system for a photovoltaic system including a photovoltaic array formed by connecting a plurality of photovoltaic strings in parallel, each of the plurality of photovoltaic strings being formed by serially connecting a plurality of photovoltaic modules, the failure diagnosis system comprising:
an array measurement apparatus configured to measure an output voltage and an output current of the photovoltaic array;
string current measurement apparatus configured to measure output currents of the plurality of photovoltaic strings; and
a monitoring apparatus,
wherein the monitoring apparatus is configured to:
iteratively calculate an estimated irradiation on a first photovoltaic string included in the plurality of photovoltaic strings and an estimated operating temperature of the first photovoltaic string based on a short-circuit current and an open-circuit voltage on a current-voltage characteristic of the first photovoltaic string, and the array output voltage value and the array output current value measured by the array measurement apparatus;
iteratively calculate an estimated current value of the first photovoltaic string based on the estimated irradiation, the estimated operating temperature, and the current-voltage characteristic;
diagnose degradation of the first photovoltaic string by comparing the measured current value of the first photovoltaic string, which is measured by the string current measurement apparatus, and the estimated current value;
estimate a number of faulty modules included in the first photovoltaic string based on a difference between the estimated current value and the measured current value;
generate an image of the diagnosis for the first photovoltaic string including the number of faulty modules to an output device;
iteratively calculate a number of effective cells in each of the faulty modules to be operationally terminated based, at least in part, on the comparison of the measured current value and the estimated current value of the first photovoltaic string; and
cause termination of operations of the number of effective cells in each of the faulty modules to decrease operation of the number of faulty modules in the first photovoltaic string, when the measured current value is lower than the estimated current value.

2. The failure diagnosis system according to claim 1, wherein the monitoring apparatus is configured to calculate the estimated irradiation based on the array output current value and a ratio of a maximum operating current to the short-circuit current of the first photovoltaic string.

3. The failure diagnosis system according to claim 2, wherein the monitoring apparatus is configured to calculate the estimated operating temperature based on the array output voltage value, the open-circuit voltage of the first photovoltaic string with the estimated irradiation at a reference temperature, a temperature characteristic of the open-circuit voltage, and the ratio.

4. A failure diagnosis system for a photovoltaic system including a photovoltaic array formed by connecting a plurality of photovoltaic strings in parallel, each of the plurality of photovoltaic strings being formed by serially connecting a plurality of photovoltaic modules, the failure diagnosis system comprising:
an array measurement apparatus configured to measure an output voltage of the photovoltaic array;
string current measurement apparatus configured to measure output currents of the plurality of photovoltaic strings;
an irradiation measurement apparatus configured to measure an irradiation;
an atmospheric temperature measurement apparatus configured to measure an atmospheric temperature; and
a monitoring apparatus,
wherein the monitoring apparatus is configured to:
iteratively calculate an estimated operating temperature based on information of the irradiation measured by the irradiation measurement apparatus and the atmospheric temperature measured by the atmospheric temperature measurement apparatus, and a predetermined linear relational expression of the irradiation and a difference between an operating temperature of the plurality of photovoltaic strings and the atmospheric temperature;
iteratively calculate an estimated shunt resistance value of a first photovoltaic string included in the plurality of photovoltaic strings from a current-voltage characteristic of the first photovoltaic string based on the output current value of the first photovoltaic string measured by the string current measurement apparatus, the output voltage value of the first photovoltaic string measured by the array measurement apparatus, the measured irradiation, and the estimated operating temperature;
diagnose degradation of the first photovoltaic string by comparing the estimated shunt resistance value and a threshold value;
estimate a number of faulty modules included in the first photovoltaic string based on the estimated shunt resistance value and the threshold value;
generate an image of the diagnosis for the first photovoltaic string including the number of faulty modules to an output device; and
iteratively calculate a number of effective cells in each of the faulty modules to be operationally terminated based, at least in part, on the comparison of the estimated shunt resistance value and the threshold value; and
cause termination of operations of the number of effective cells in each of the faulty modules to decrease operation of the number of faulty modules in the first photovoltaic string when the estimated shunt resistance is larger than the threshold value.

5. The failure diagnosis system according to claim 4, wherein:
the array measurement apparatus is configured to measure an output current of the photovoltaic array; and
when it is determined by the comparison between the estimated shunt resistance value and the threshold value that the first photovoltaic string does not degrade, the monitoring apparatus is configured to:
calculate an estimated irradiation of the first photovoltaic string and a second estimated operating temperature of the first photovoltaic string based on a short-circuit current and an open-circuit voltage on the current-voltage characteristic of the first photovoltaic string, and the array output voltage value and the array output current value measured by the array measurement apparatus;

calculate an estimated current value of the first photovoltaic string based on the estimated irradiation, the second estimated operating temperature and the current-voltage characteristic; and diagnose the degradation of the first photovoltaic string by comparing the measured current value of the first photovoltaic string measured by the string current measurement apparatus and the estimated current value.

6. A failure diagnosis method for a photovoltaic system including a photovoltaic array formed by connecting a plurality of photovoltaic strings in parallel, each of the plurality of photovoltaic strings being formed by serially connecting a plurality of photovoltaic modules, the failure diagnosis method comprising:

iteratively calculating an estimated irradiation on a first photovoltaic string included in the plurality of photovoltaic strings and a second estimated operating temperature of the first photovoltaic string based on a short-circuit current and an open-circuit voltage on a current-voltage characteristic of the first photovoltaic string, and an array output voltage value and an array output current value measured by an array measurement apparatus;

iteratively calculating an estimated current value of the first photovoltaic string based on the estimated irradiation, the second estimated operating temperature, and the current-voltage characteristic;

diagnosing degradation of the first photovoltaic string by comparing the measured current value of the first photovoltaic string measured by a string current measurement apparatus, and the estimated current value;

estimating a number of faulty modules included in the first photovoltaic string based on a difference between the measured current value and the estimated current value;

generating an image of the diagnosis for the first photovoltaic string including the number of faulty modules to an output device;

iteratively calculating a number of effective cells in each of the faulty modules to be operationally terminated based, at least in part, on the comparison of the measured current value and the estimated current value of the first photovoltaic string; and causing termination of operations of the number of effective cells in each of the faulty modules to decrease operation of the number of faulty modules in the first photovoltaic string, when the measured current value is lower than the estimated current value.

7. The failure diagnosis method according to claim 6, further comprising calculating the estimated irradiation based on the array output current value and a ratio of a maximum operating current to the short-circuit current of the first photovoltaic string.

8. The failure diagnosis method according to claim 7, further comprising calculating the second estimated operating temperature based on the array output voltage value, the open-circuit voltage of the first photovoltaic string with the estimated irradiation at a reference temperature, a temperature characteristic of the open-circuit voltage, and the ratio.

9. A failure diagnosis method for a photovoltaic system including a photovoltaic array formed by connecting a plurality of photovoltaic strings in parallel, each of the plurality of photovoltaic strings being formed by serially connecting a plurality of photovoltaic modules, the failure diagnosis method comprising:

iteratively calculating an estimated operating temperature based on information of an irradiation measured by an irradiation measurement apparatus and an atmospheric temperature measured by an atmospheric temperature measurement apparatus, and a predetermined linear relational expression of the irradiation and a difference between an operating temperature of the plurality of photovoltaic strings and the atmospheric temperature;

iteratively calculating an estimated shunt resistance value of a first photovoltaic string included in the plurality of photovoltaic strings from a current-voltage characteristic of the first photovoltaic string based on an output current value of the first photovoltaic string measured by a string current measurement apparatus, an output voltage value of the first photovoltaic string measured by an array measurement apparatus, the measured irradiation, and the estimated operating temperature;

diagnosing degradation of the first photovoltaic string by comparing the estimated shunt resistance value and a threshold value;

estimating a number of faulty modules included in the first photovoltaic string based on the estimated shunt resistance value and the threshold value;

generating an image of the diagnosis for the first photovoltaic string including the number of faulty modules to an output device;

iteratively calculating a number of effective cells in each of the faulty modules to be operationally terminated based, at least in part, on the comparison of the estimated shunt resistance value and the threshold value; and causing termination of operations of the number of effective cells in each of the faulty modules to decrease operation of the number of faulty modules in the first photovoltaic string when the estimated shunt resistance is larger than the threshold value.

10. The failure diagnosis method according to claim 9, further comprising, when it is determined by the comparison between the estimated shunt resistance value and the threshold value that the first photovoltaic string does not degrade:

calculating an estimated irradiation of the first photovoltaic string and a second estimated operating temperature of the first photovoltaic string based on a short-circuit current and an open-circuit voltage on the current-voltage characteristic of the first photovoltaic string, and an array output voltage value and an array output current value measured by the array measurement apparatus;

calculating an estimated current value of the first photovoltaic string based on the estimated irradiation, the second estimated operating temperature, and the current-voltage characteristic; and diagnosing the degradation of the first photovoltaic string by comparing the measured current value of the first photovoltaic string measured by the string current measurement apparatus, and the estimated current value.

* * * * *